(12) United States Patent
Fukuda et al.

(10) Patent No.: US 9,397,831 B2
(45) Date of Patent: Jul. 19, 2016

(54) ENCRYPTED COMMUNICATION DEVICE AND METHOD FOR PERFORMING ENCRYPTED COMMUNICATION WHILE REDUCING TRAFFIC IN COMMUNICATION SYSTEM

(71) Applicant: FUJITSU LIMITED, Kawasaki-shi, Kanagawa (JP)

(72) Inventors: Isamu Fukuda, Yokohama (JP); Tetsuta Sakabe, Yokohama (JP); Toshihiro Kobayashi, Yokohama (JP); Nobuyuki Fukuda, Yokohama (JP); Kazuhiro Yasuno, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 234 days.

(21) Appl. No.: 14/203,858

(22) Filed: Mar. 11, 2014

(65) Prior Publication Data

US 2014/0289527 A1 Sep. 25, 2014

(30) Foreign Application Priority Data

Mar. 21, 2013 (JP) ................................ 2013-058782

(51) Int. Cl.
*H04L 9/08* (2006.01)
*H04L 29/06* (2006.01)

(52) U.S. Cl.
CPC ............ *H04L 9/0869* (2013.01); *H04L 9/0891* (2013.01); *H04L 63/0428* (2013.01); *H04L 63/061* (2013.01)

(58) Field of Classification Search
CPC .......................... H04L 63/0485; H04L 63/061
See application file for complete search history.

(56) References Cited

U.S. PATENT DOCUMENTS

| 7,962,741 | B1* | 6/2011 | Alexander | .......... | H04L 63/0485 709/230 |
| 2007/0091886 | A1* | 4/2007 | Davis | .................... | H04W 28/06 370/389 |
| 2008/0101366 | A1* | 5/2008 | Venkitaraman | ..... | H04L 12/4633 370/392 |

(Continued)

FOREIGN PATENT DOCUMENTS

JP 2010-34860 2/2010

OTHER PUBLICATIONS

Kaufman et al., RFC 5996: Internet Key Exchange Protocol Version 2, Sep. 2010, IETF.*

(Continued)

*Primary Examiner* — Saleh Najjar
*Assistant Examiner* — Louis Teng
(74) *Attorney, Agent, or Firm* — Fujitsu Patent Center

(57) ABSTRACT

An encrypted communication device includes: a pattern generation unit configured to judge whether or not a security association including as matching data a data portion whose data pattern matches between data in a packet targeted for processing and data in a sample packet is to be generated; a key information exchange unit configured to transmit to an opposite device a key information exchange packet including the matching data and key data when the pattern generation unit judges that the security association is to be generated, and receives from the opposite device a key information exchange packet including a security association identifier of the security association, thereby establishing the security association with the opposite device; and a key information unit configured to store the matching data, the key data, and the security association identifier of the security association established by the key information exchange unit.

15 Claims, 24 Drawing Sheets

(56) References Cited

U.S. PATENT DOCUMENTS

| | | | | |
|---|---|---|---|---|
| 2010/0031015 A1* | 2/2010 | Hamamura | ......... | H04L 63/0428 713/150 |
| 2010/0189103 A1* | 7/2010 | Bachmann | .............. | H04L 69/04 370/389 |
| 2013/0329885 A1* | 12/2013 | Davis | .................... | H04W 28/06 380/255 |
| 2014/0181319 A1* | 6/2014 | Chen | ....................... | H04L 47/33 709/234 |

OTHER PUBLICATIONS

Kent et al., RFC 4301: Security Architecture for the Internet Protocol, Dec. 2005, IETF.*

* cited by examiner

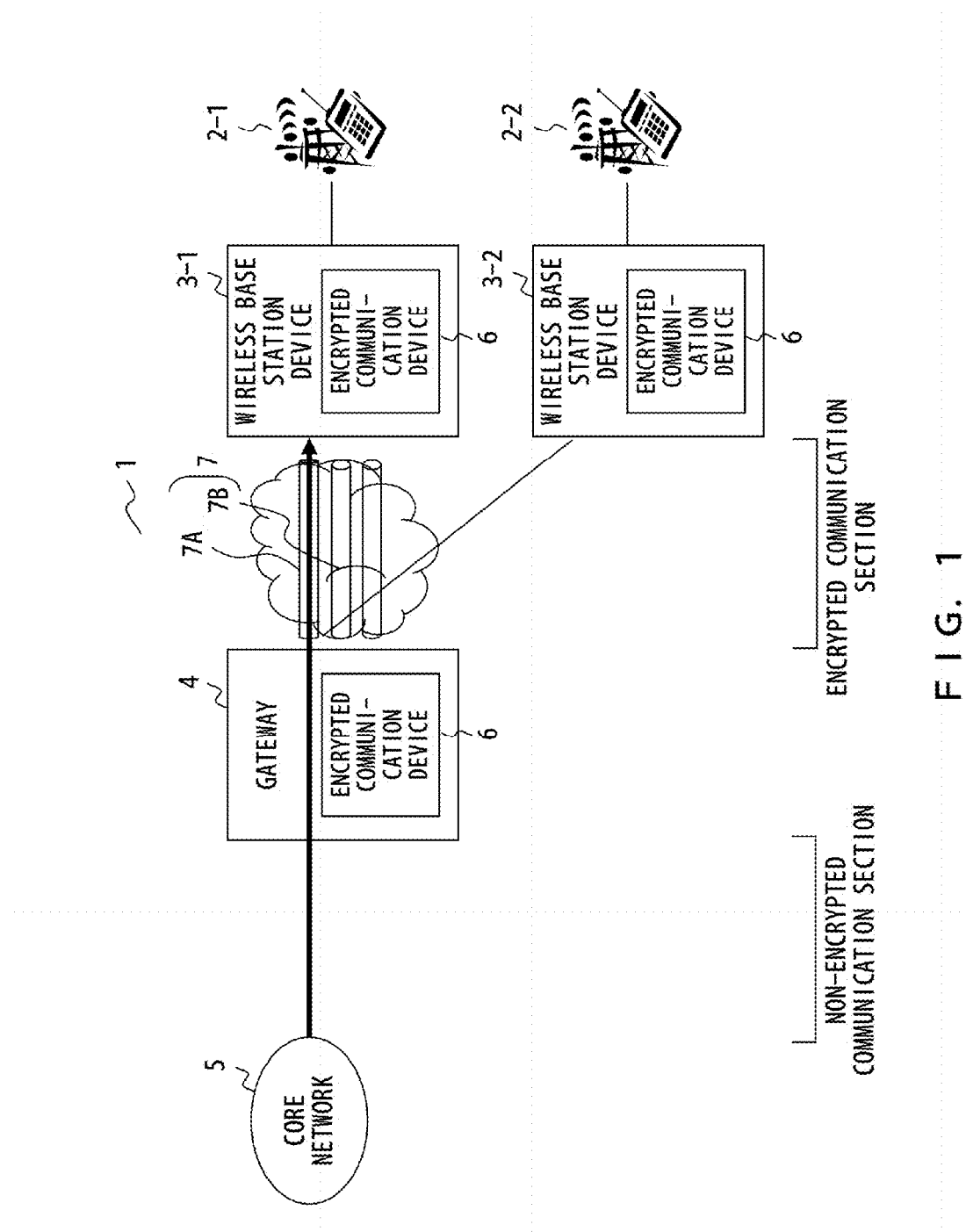
F I G. 1

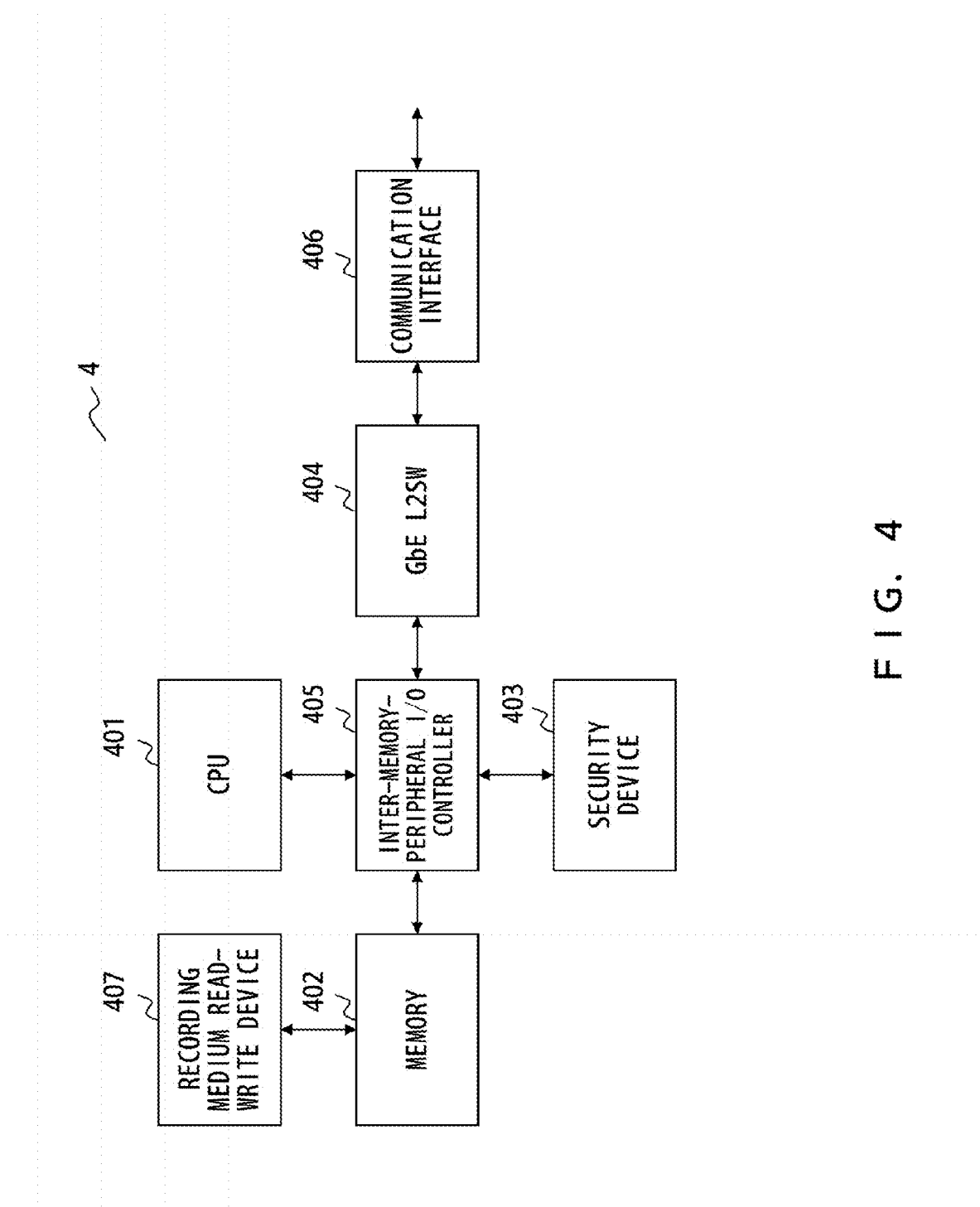
F I G. 4

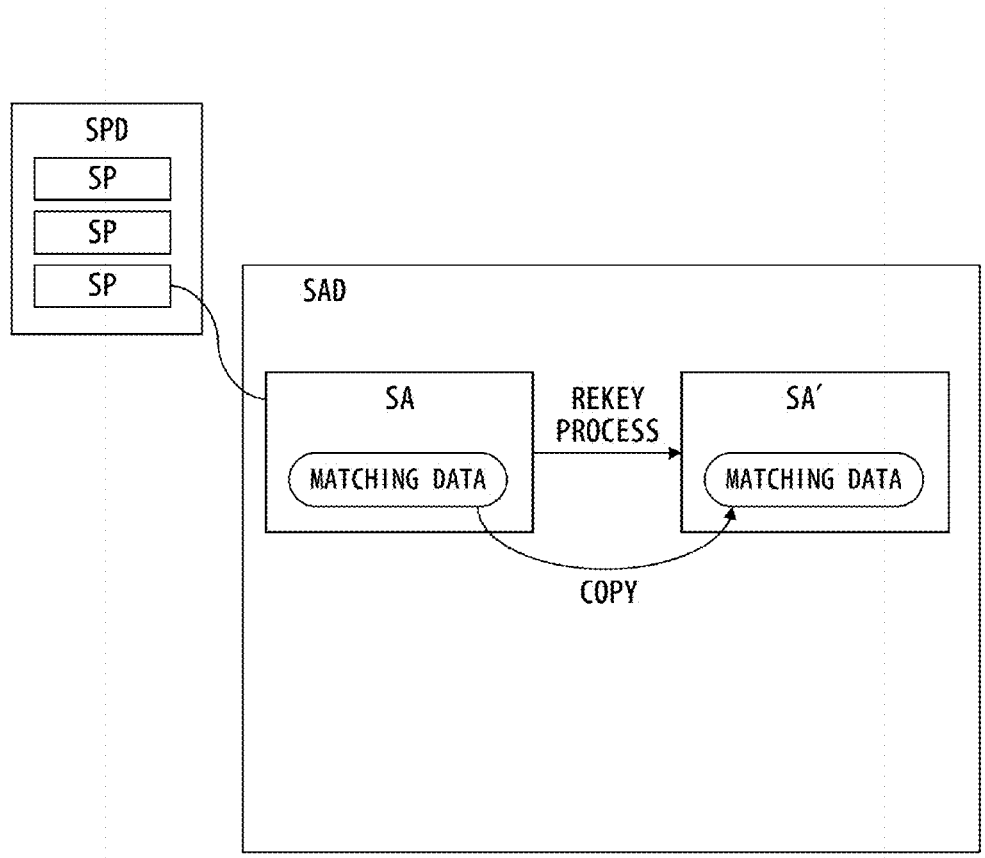
F I G. 6

| SA | PARAMETER |
| | KEY DATA |
| | MATCHING DATA |
| | SA IDENTIFIER |

FIG. 7

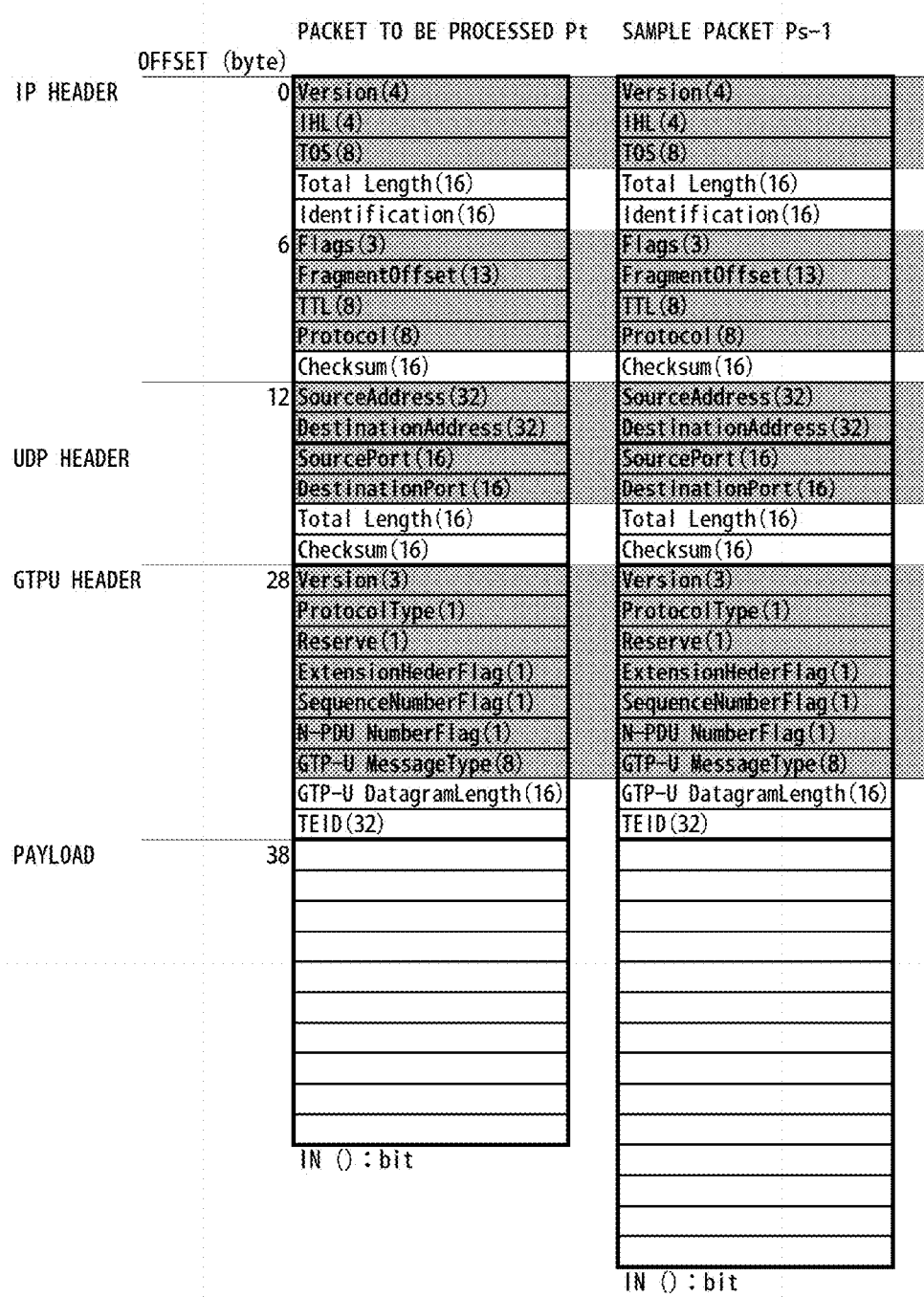
F I G. 8A

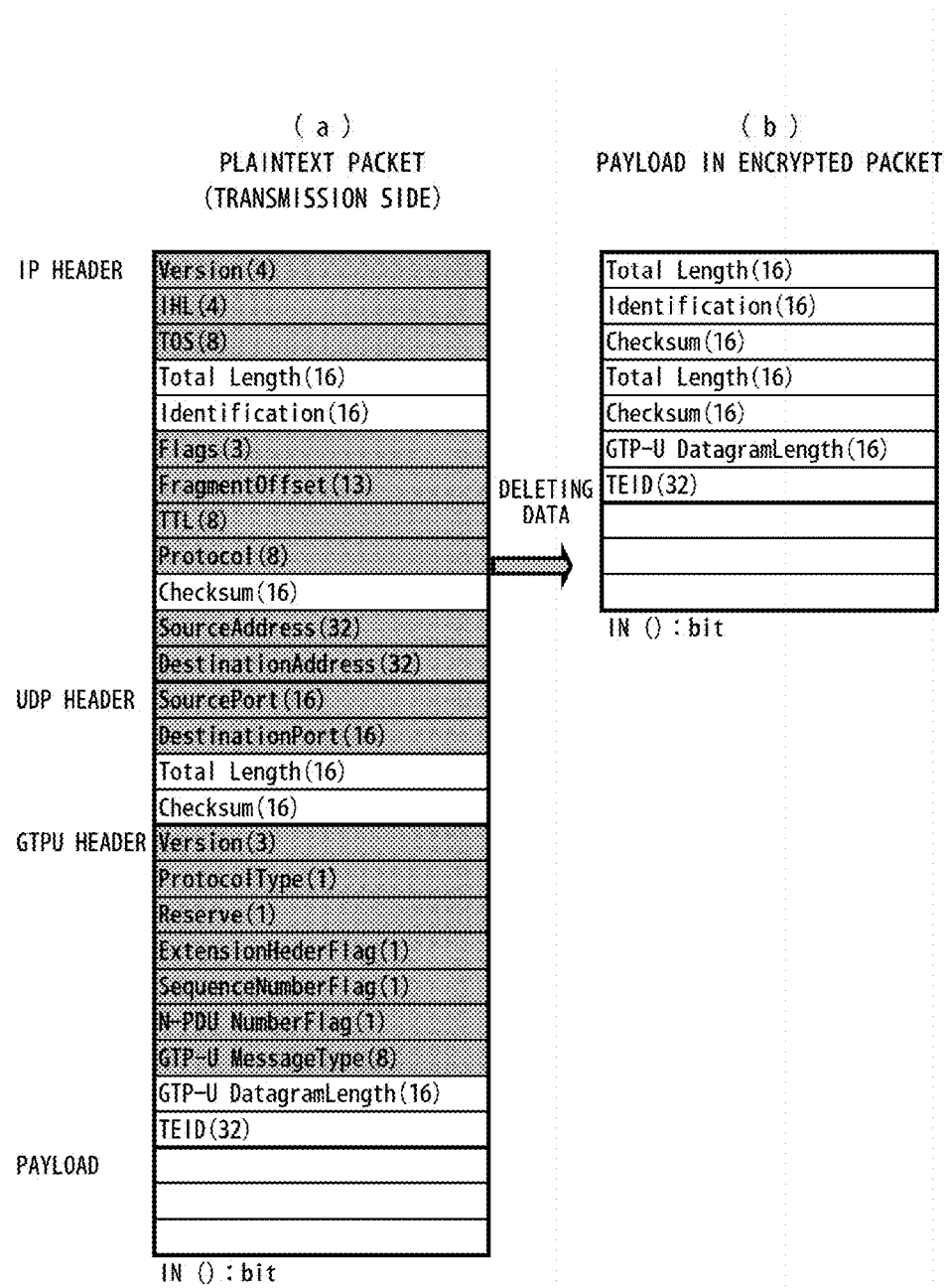
F I G. 9A

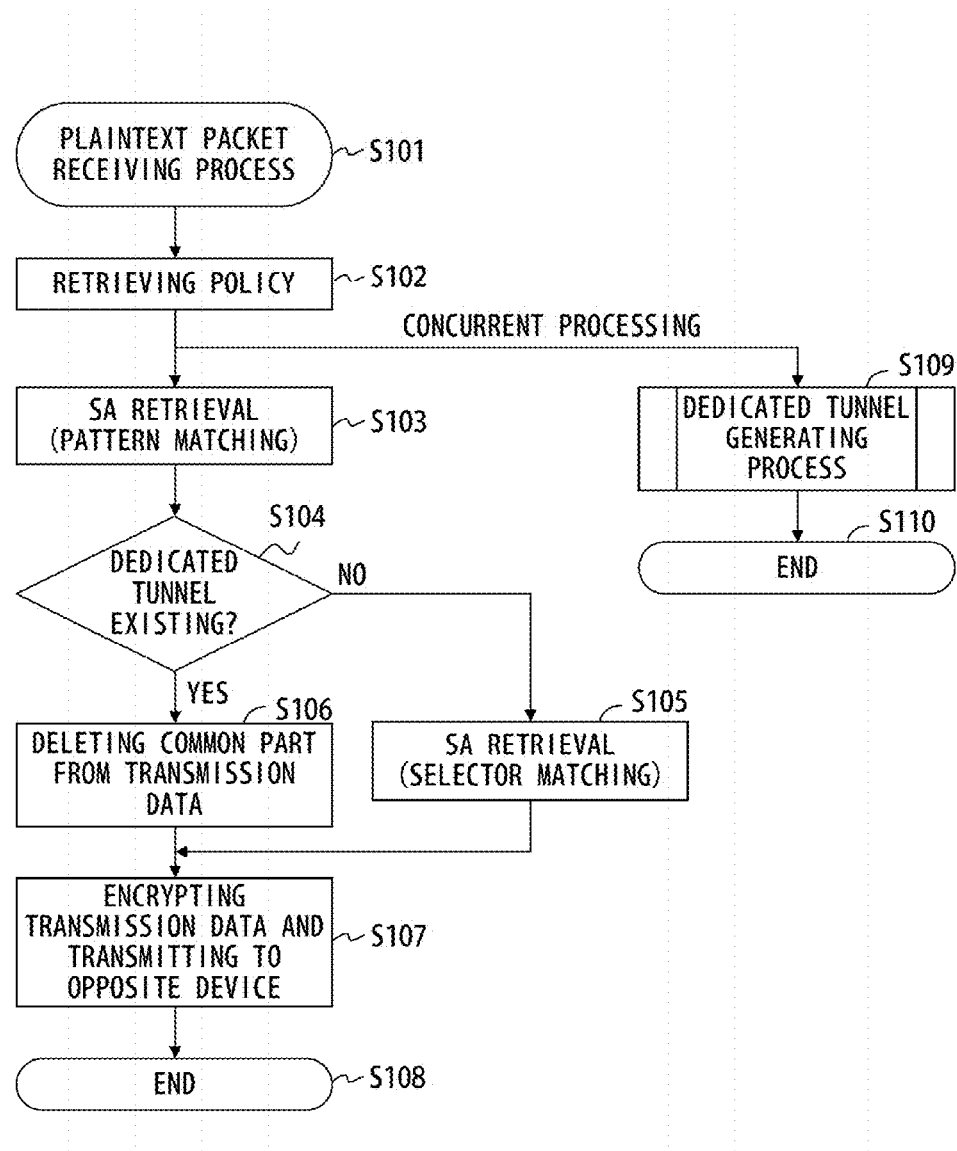
F I G. 10

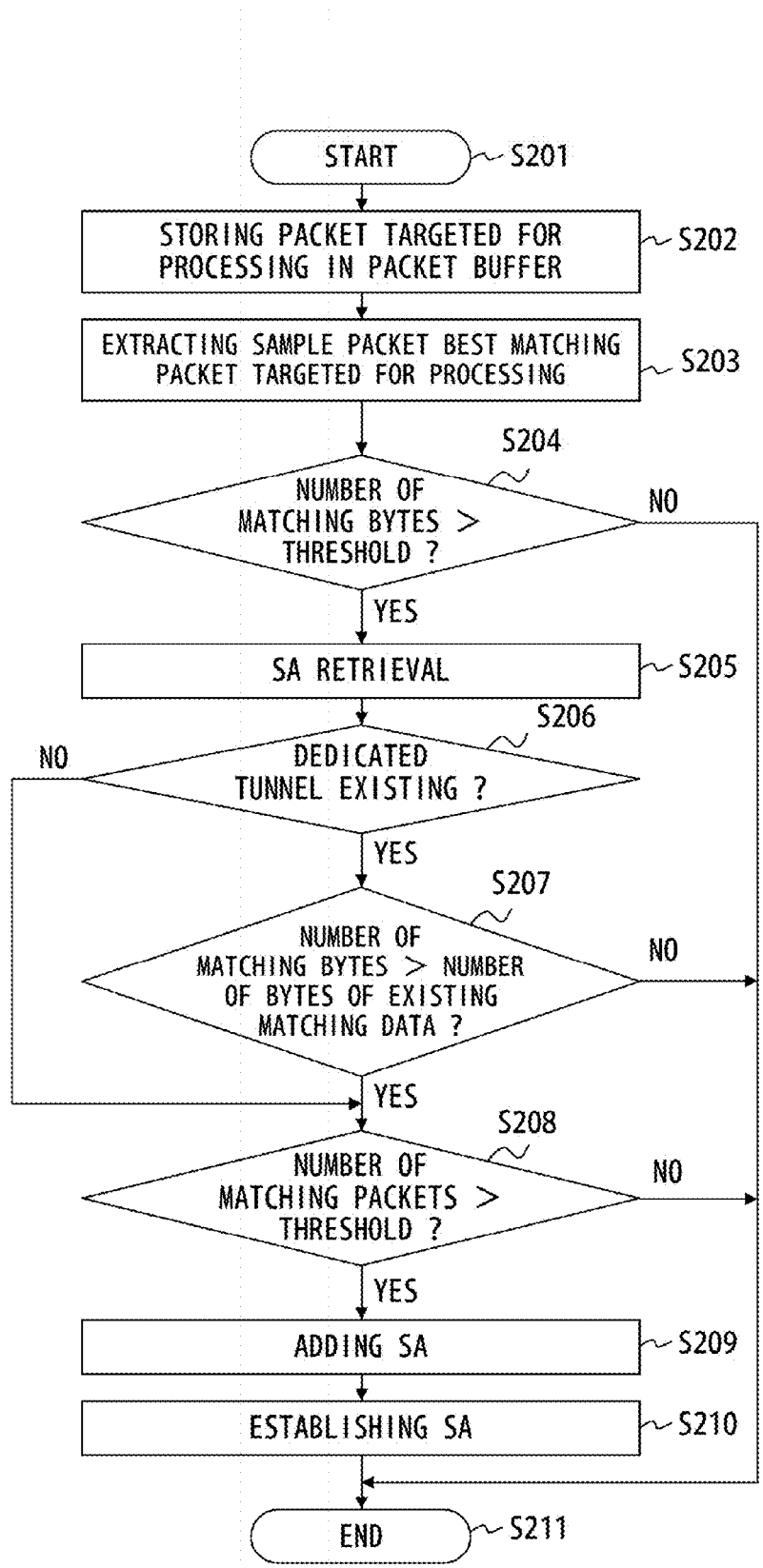
F I G. 11

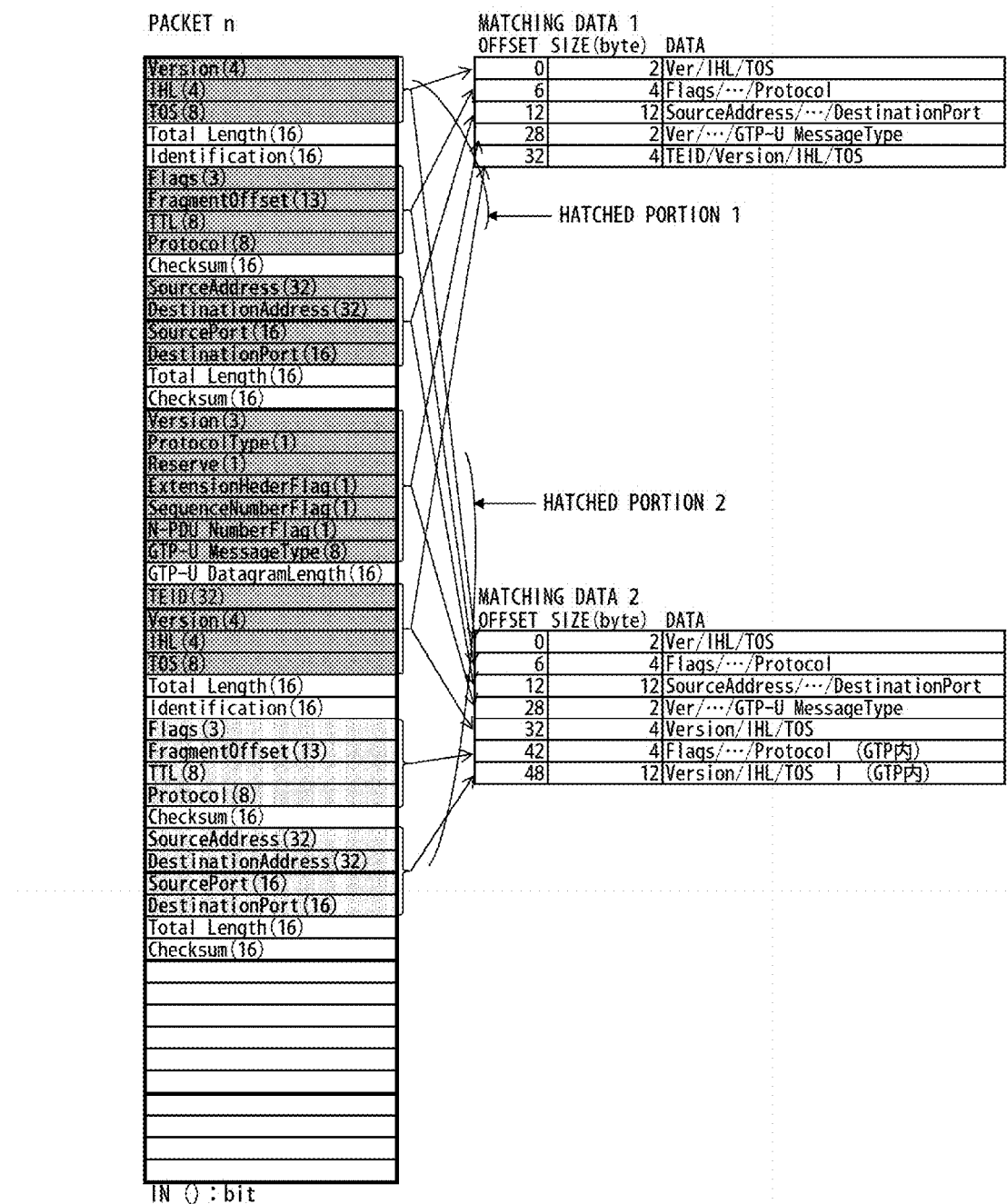
F I G. 1 2 B

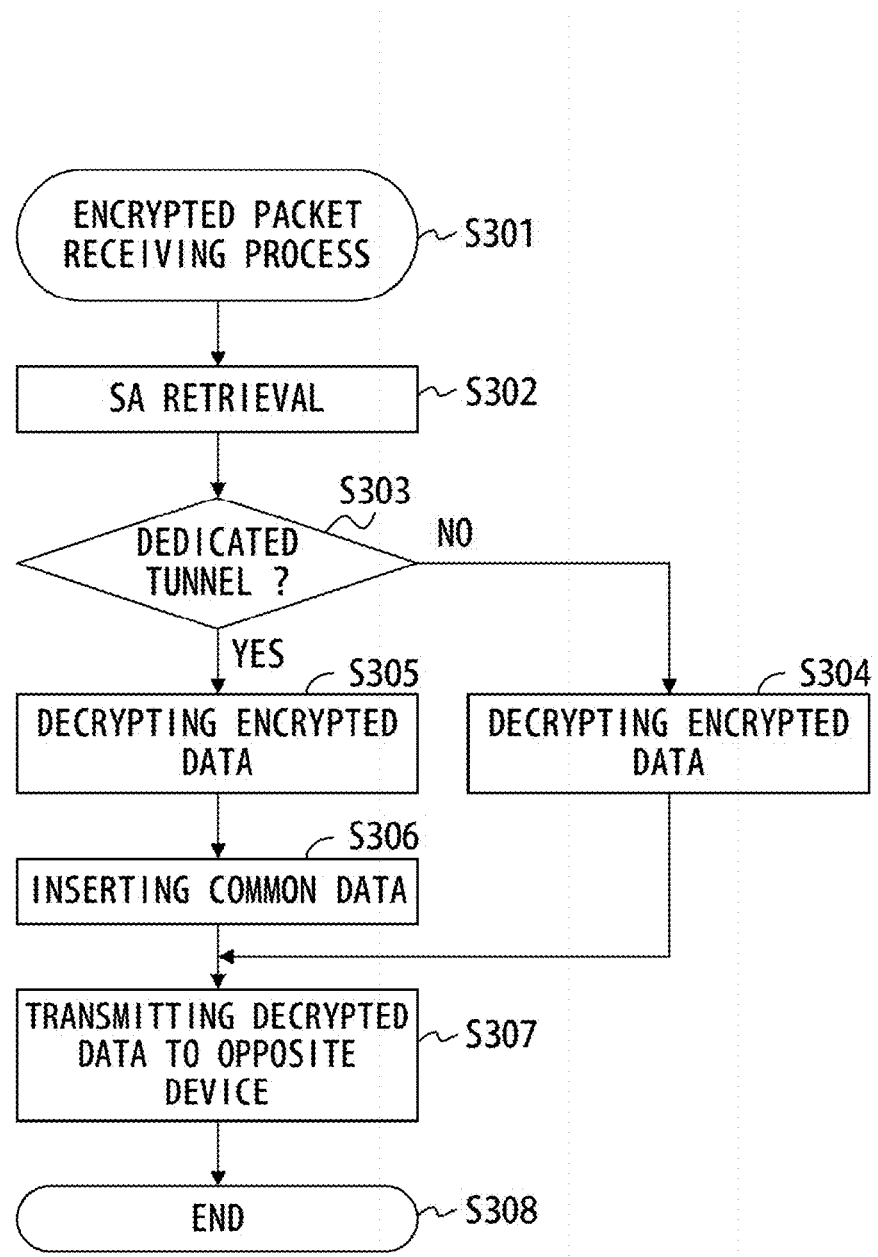
F I G. 13

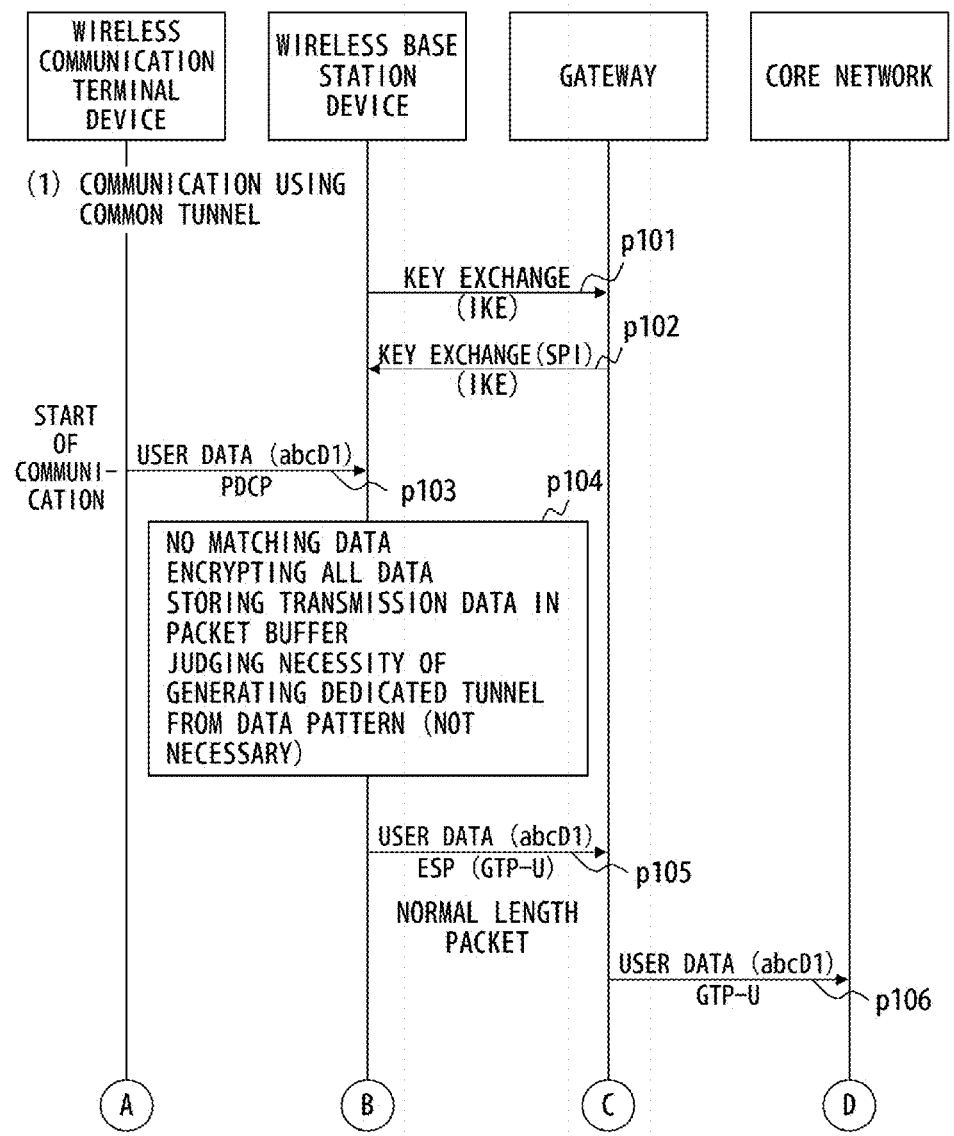
F I G. 14A

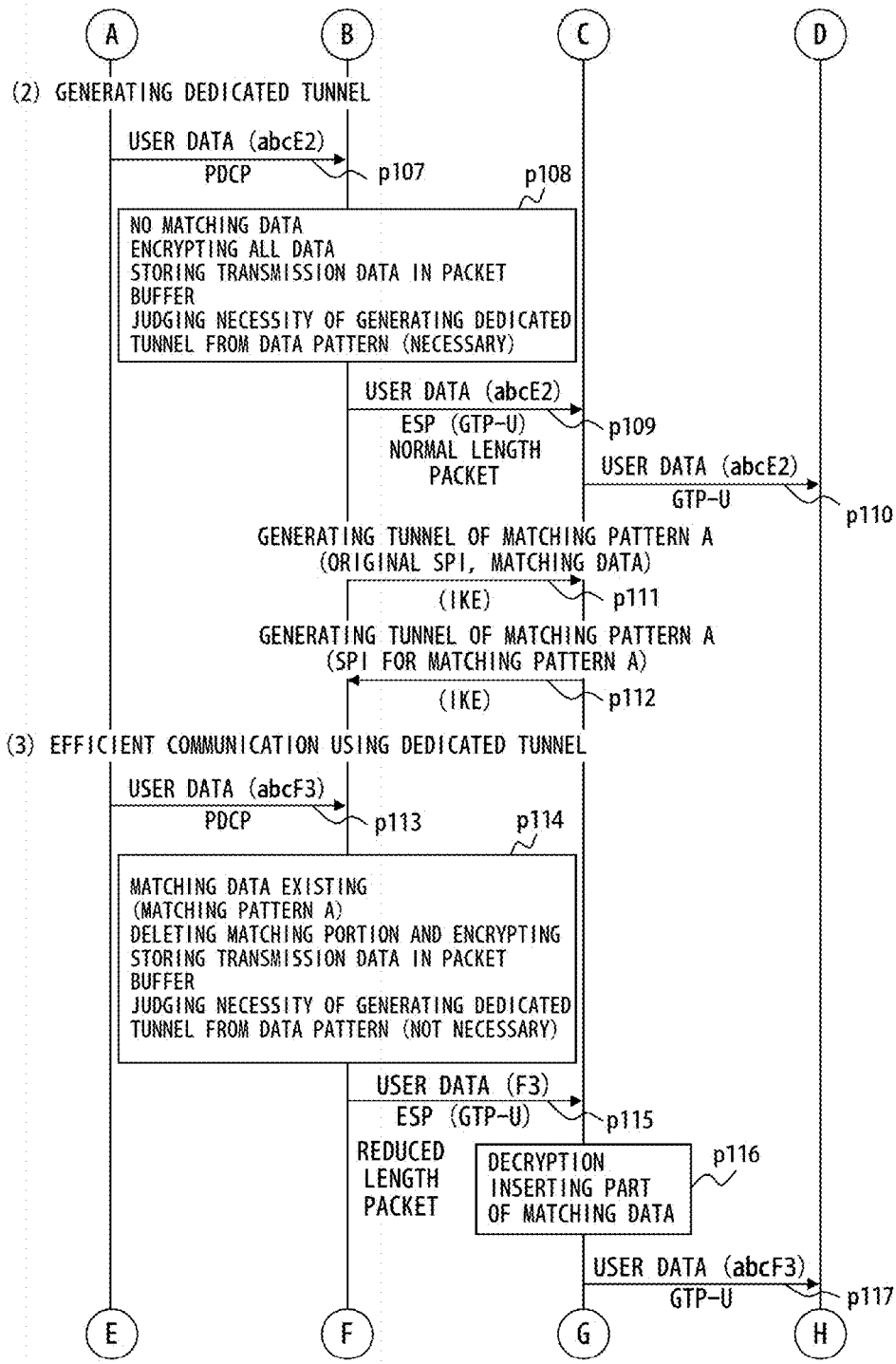
F I G. 14B

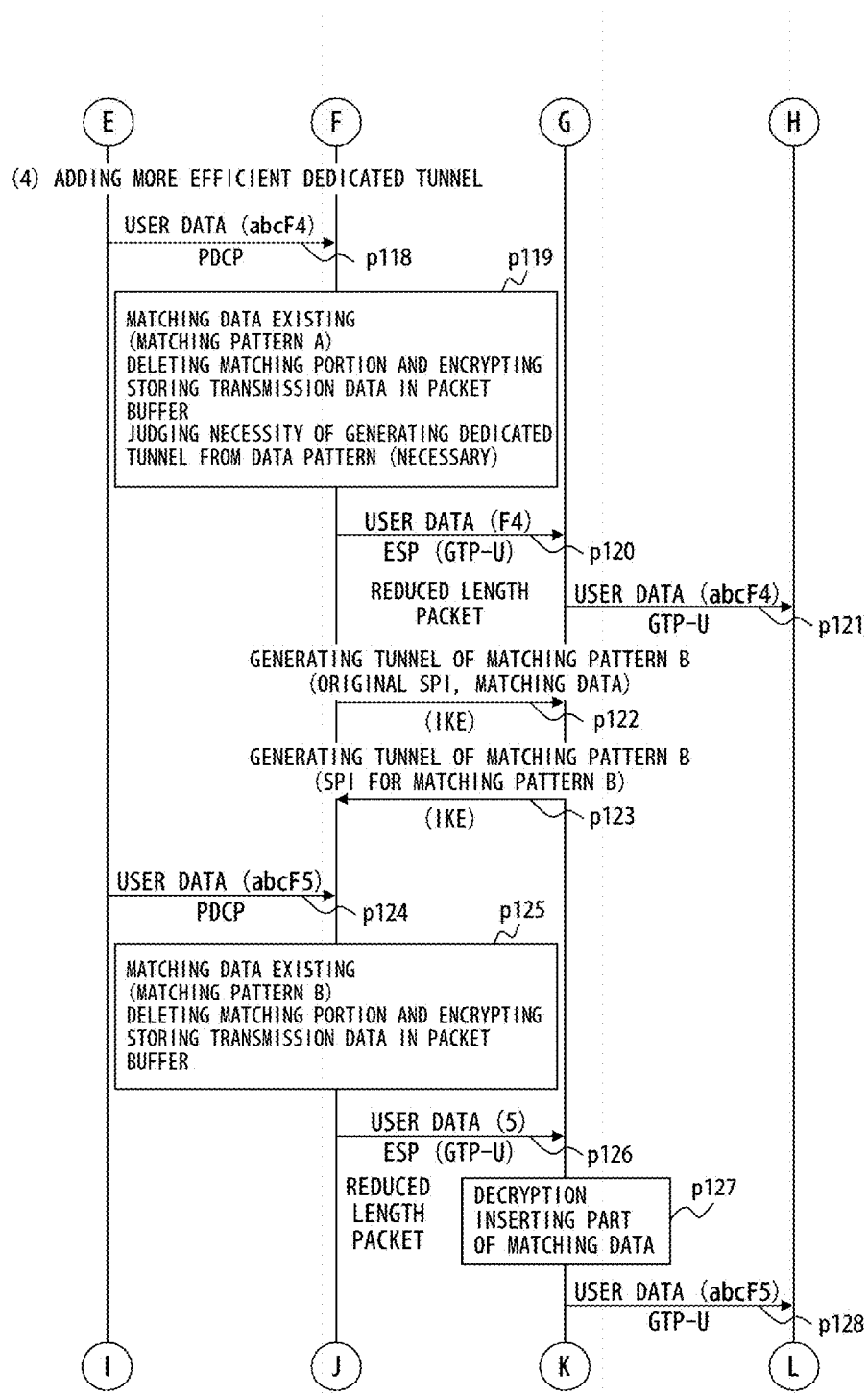
F I G. 14C

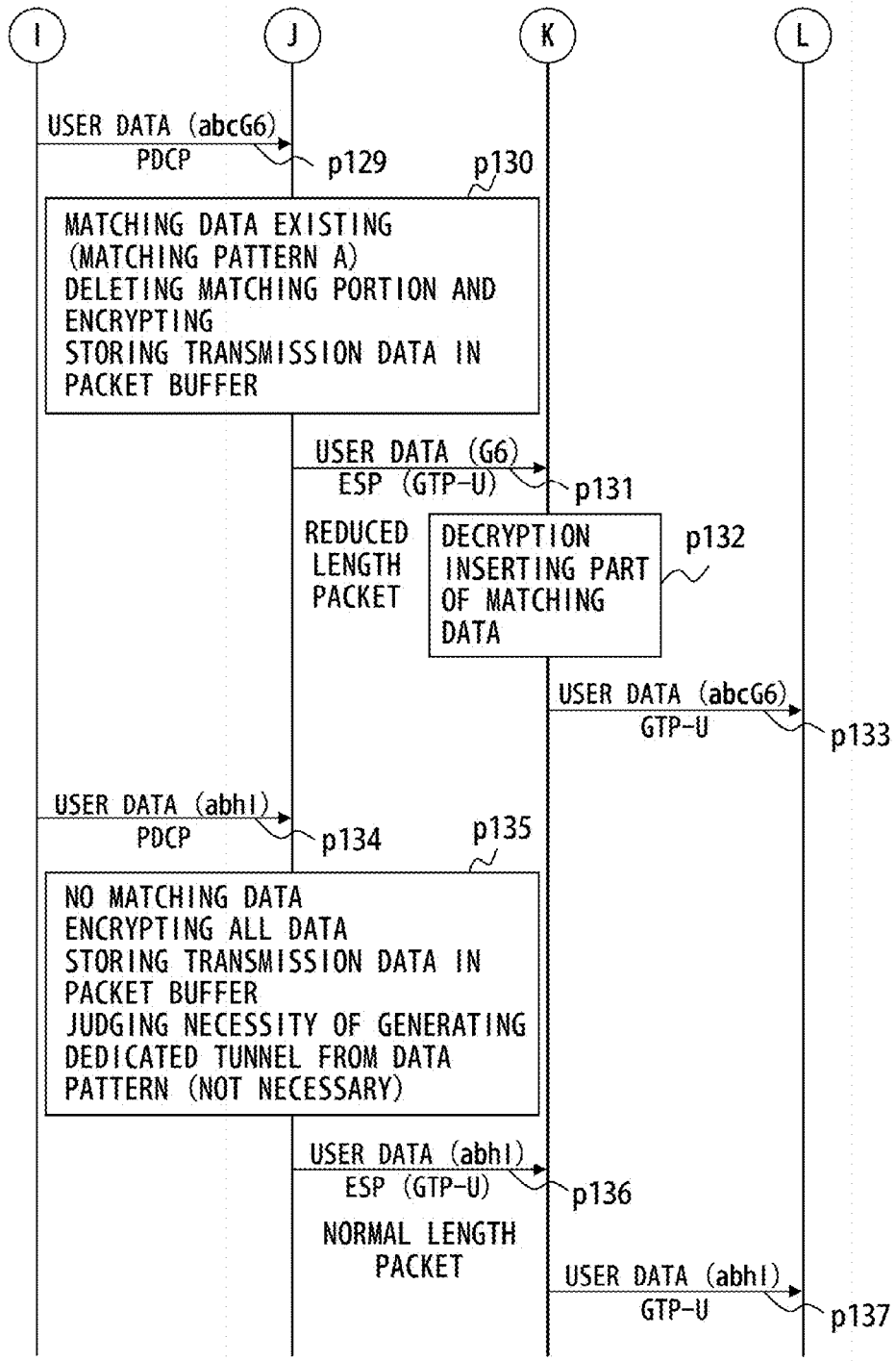
F I G. 14D

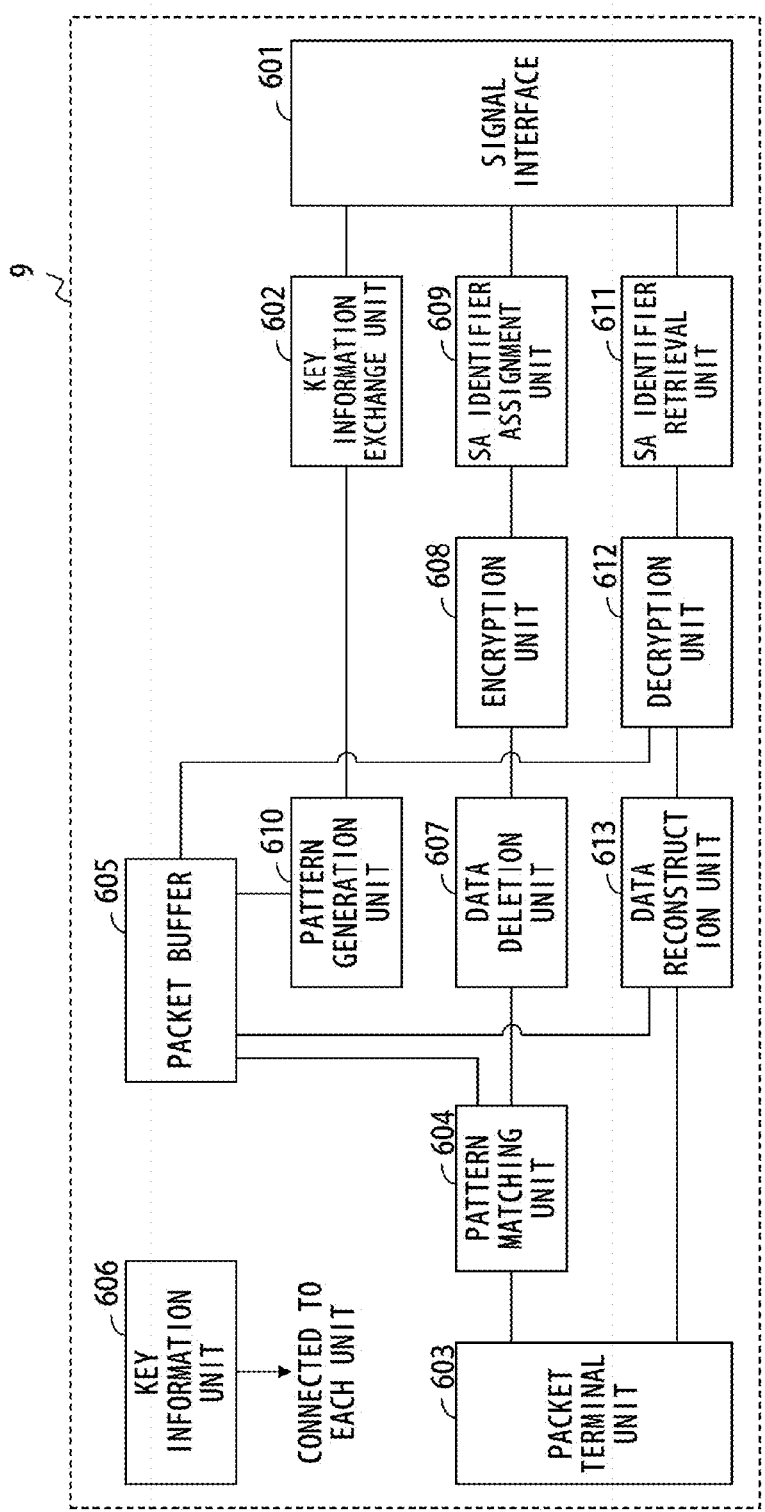
F I G. 1 8

ENCRYPTED COMMUNICATION DEVICE AND METHOD FOR PERFORMING ENCRYPTED COMMUNICATION WHILE REDUCING TRAFFIC IN COMMUNICATION SYSTEM

CROSS-REFERENCE TO RELATED APPLICATIONS

This application is based upon and claims the benefit of priority of the prior Japanese Patent Application No. 2013-058782, filed on Mar. 21, 2013, the entire contents of which are incorporated herein by reference.

FIELD

The present invention is related to an encrypted communication device, an encrypted communication method, and an encrypted communication program.

BACKGROUND

Recently, the Internet protocol (IP) has been used on a number of communication bases regardless of a fixed communication and a mobile communication. In the field of mobile communication, a multifunction mobile telephone capable of implementing various application programs which communicate data by connection to the Internet has become widespread. Such a multifunction mobile telephone is referred to also as a smart-phone.

The above-mentioned multifunction mobile telephone may implement phone call application software using voice over IP (VoIP) and IP television telephone application software. For communications using such application software, a short packet of 64 bytes, 128 bytes, etc. is used to suppress a transmission delay. Since the amount of transmittable data by using a short packet is small, a large number of packets are used to transmit data. With the above-mentioned application software, a control signal is periodically communicated in the period in which a user data signal is not communicated. As a result, with an increasing use of application software by a multifunction mobile telephone, the traffic in a communication system increases.

In the communication system, an IP packet of a user data signal, a control signal, etc. may be transmitted after being encrypted for security. The encryption protocol may be, for example, security architecture for Internet protocol (IPsec). The encryption of data by the IPsec is performed in an IP layer, and the communication according to the application software, which is in a layer that is higher than a layer of the IPsec, is performed without recognition of the encryption by the IPsec. The process load of the device such as a security gateway etc. which performs the encrypted communication processing of an IP packet increases with the increase of the traffic in the communication system as described above.

The following technology is known as the technology of reducing the process load of the device which performs the encrypted communication processing of an IP packet. That is, in the IP network system having a security function, a transmitting device fragments packet data into a plurality of packets, and judges whether or not each of the plurality of fragmented packets is a packet targeted for encryption and transmission. Then, the transmitting device applies the IPsec communication only to a packet targeted for encryption and transmission in the plurality of fragmented packets, and transmits the other packets without encryption.

In the above-mentioned well known technology, the transmitting device only encrypts and transmits a part of packet data which is fragmented into a plurality of packets, and transmits the other fragmented packet data without encryption. That is, in the above-mentioned well known technology, all packet data is transmitted in a communication system, thereby not suppressing the increase of traffic in the communication system.

RELATED ART DOCUMENT

Patent Documents

[Patent Document 1] Japanese Laid-open Patent Publication No. 2010-34860

SUMMARY

According to one aspect of the embodiments, an encrypted communication device includes: a pattern generation unit configured to judge whether or not a security association including as matching data a data portion whose data pattern matches between data in a packet targeted for processing and data in a sample packet is to be generated; a key information exchange unit configured to transmit to an opposite device a key information exchange packet including the matching data and key data when the pattern generation unit judges that the security association is to be generated, and receives from the opposite device a key information exchange packet including a security association identifier of the security association, thereby establishing the security association with the opposite device; and a key information unit configured to store the matching data, the key data, and the security association identifier of the security association established by the key information exchange unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary configuration of a communication system according to the first embodiment of the present invention;

FIG. 4 is an exemplary hardware configuration of a gateway;

FIG. 6 is an explanatory view of the database stored in a key information unit;

FIG. 7 illustrates an exemplary configuration of an SA;

FIG. 8A is an explanatory view of exemplary matching data;

FIG. 9A is an explanatory view of an encrypted communication using illustrative matching data in FIG. 8B;

FIG. 10 illustrates an exemplary flowchart of an encrypting process according to the first embodiment of the present invention;

FIG. 11 illustrates exemplary flowchart of a dedicated tunnel generating process;

FIG. 12B is an explanatory view of exemplary matching data generated based on one packet;

FIG. 13 illustrates an exemplary flowchart of a decrypting process according to the first embodiment of the present invention;

FIG. 14A is an exemplary sequence diagram of encrypted communication processing of a communication system according to the first embodiment of the present invention;

FIG. 14B is an exemplary sequence diagram of encrypted communication processing of a communication system according to the first embodiment of the present invention;

FIG. 14C is an exemplary sequence diagram of encrypted communication processing of a communication system according to the first embodiment of the present invention;

FIG. 14D is an exemplary sequence diagram of encrypted communication processing of a communication system according to the first embodiment of the present invention;

FIG. 18 illustrates an exemplary functional configuration of an encrypted communication device according to the third embodiment of the present invention.

DESCRIPTION OF EMBODIMENTS

Figure 2:
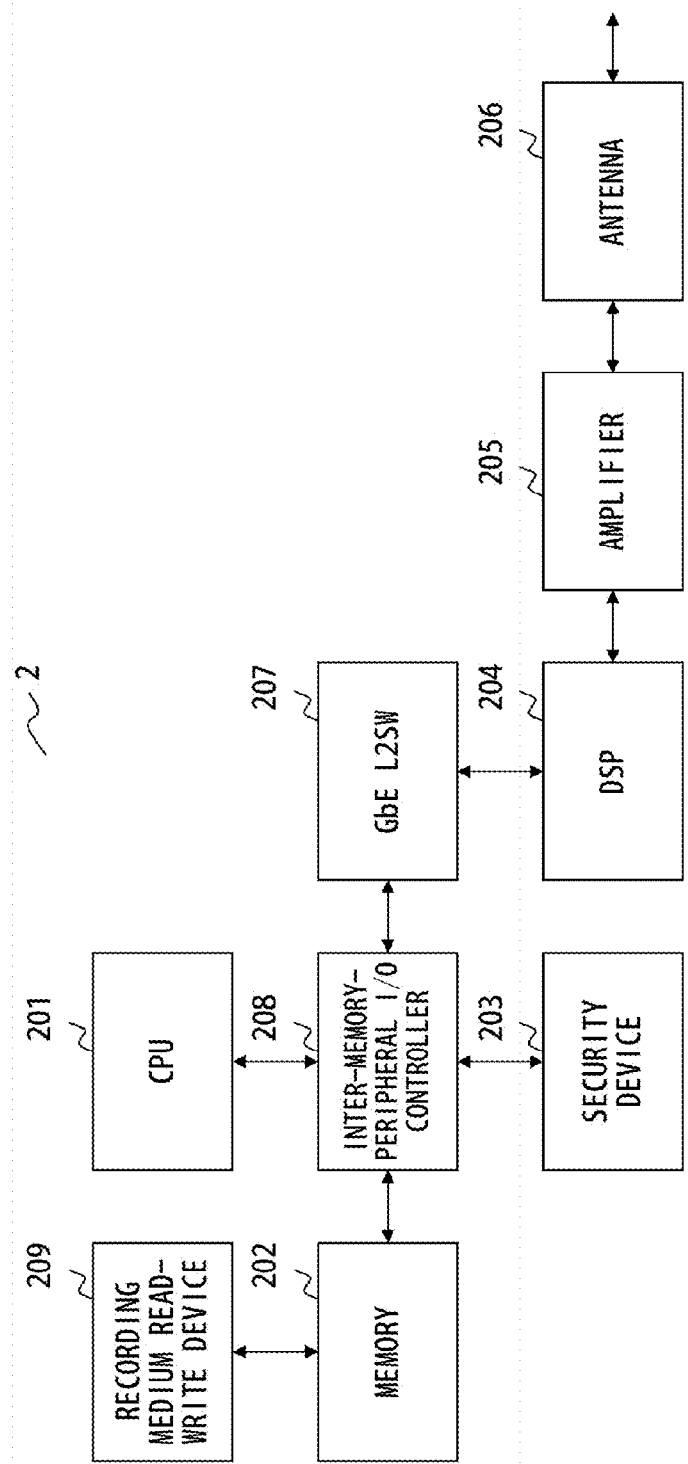
FIG. 2 is an exemplary hardware configuration of a wireless communication terminal device.

The embodiments of the present invention are described below in detail with reference to the attached drawings.

First Embodiment

FIG. 1 illustrates an exemplary configuration of a communication system according to the first embodiment of the present invention. As illustrated in FIG. 1, a communication system 1 includes wireless communication terminal devices 2-1 and 2-2, wireless base station devices 3-1 and 3-2, a gateway (GW) 4, and a core network 5. In the example illustrated in FIG. 1, the wireless base station devices 3-1 and 3-2 and the gateway 4 include an encrypted communication device 6 according to the first embodiment.

FIG. 1 illustrates the wireless communication terminal device 2-1 connected to the wireless base station device 3-1 via a wireless line, and the wireless communication terminal device 2-2 connected to the wireless base station device 3-2 via a wireless line. However, there may be any number of wireless communication terminal devices which are connected to the wireless base station device 3-1 and the wireless base station device 3-2, respectively. FIG. 1 illustrates two wireless base station devices 3-1 and 3-2 connected to the gateway 4 via a cable line. However, there may be any number of wireless base station devices connected to the gateway 4. FIG. 1 illustrates one gateway 4 connected to the core network 5 via a cable line. However, there may any number of gateways connected to the core network 5. In the following explanation, when the wireless communication terminal devices 2-1 and 2-2 are not specified, they are described as a wireless communication terminal device 2. Similarly, when the wireless base station devices 3-1 and 3-2 are not specified, they are described as a wireless base station device 3.

The wireless communication terminal device 2 communicates data with the wireless base station device 3 via a wireless line. The wireless communication terminal device 2 is, for example, user equipment (UE) defined by the technical standard specification of the Third Generation Partnership Project (3GPP). The wireless communication terminal device 2 includes, for example, a mobile telephone referred to as a smart-phone, and a mobile terminal device referred to as a tablet terminal and capable of performing a wireless communication.

FIG. 2 is an exemplary hardware configuration of a wireless communication terminal device. As illustrated in FIG. 2, the wireless communication terminal device 2 includes a central processing unit (CPU) 201, memory 202, a security device 203, a digital signal processor (DSP) 204, an amplifier 205, an antenna 206, a gigabit Ethernet layer 2 switch (GbE L2SW) 207, an inter-memory-peripheral input/output (I/O) controller 208, and a recording medium read-write device 209.

The CPU 201 controls the operation of the entire wireless communication terminal device 2. The memory 202 includes a main memory device and an auxiliary storage device. The main memory device is, for example, a random access memory (RAM) and a read only memory (ROM). The auxiliary storage device is, for example, a hard disk device (HDD). The security device 203 encrypts the data to be transmitted to an external device, and decrypts the data received from the external device. The DSP 204 is a radio signal processing module which converts a cable signal processed by the CPU 201 and/or the security device 203 into a radio signal, and converts the radio signal received from the wireless base station device 3 via the antenna 206 and the amplifier 205 into a cable signal. The amplifier 205 amplifies the radio signal converted by the DSP 204 and outputs the amplified signal to the antenna 206, and amplifies the radio signal received via the antenna 206 and outputs to the DSP 204. The wireless communication terminal device 2 transmits the radio signal to the wireless base station device 3 via the antenna 206, and receives the radio signal transmitted from the wireless base station device 3 via the antenna 206.

The GbE L2SW 207 recognizes the destination of a packet communicated between the device such as the CPU 201, the security device 203, etc. and the DSP 204, and transfers the packet to the recognized destination device. The inter-memory-peripheral I/O controller 208 controls the input/output of data between a peripheral device such as the CPU 201, the security device 203, the GbE L2SW 207, etc. and the memory 202. The recording medium read-write device 209 reads a program and data stored in a recording medium, and writes the read program and data to the memory 202. The recording medium is, for example, a magnetic disk, an optical disk, a magneto optical disk, and semiconductor memory such as flash memory etc.

The wireless base station device 3 is, for example, an evolved node B (eNodeB) defined by a technical standard specification of 3GGP. The wireless base station device 3 receives the data transmitted from the wireless communication terminal device 2 in the communication area of the wireless base station device 3 via a wireless line, and transmits the received data toward the core network 5 via the gateway 4. Furthermore, the wireless base station device 3 receives the data transmitted from the core network 5 via the gateway 4, and transmits the received data to the wireless communication terminal device 2 via a wireless line.

Figure 3:
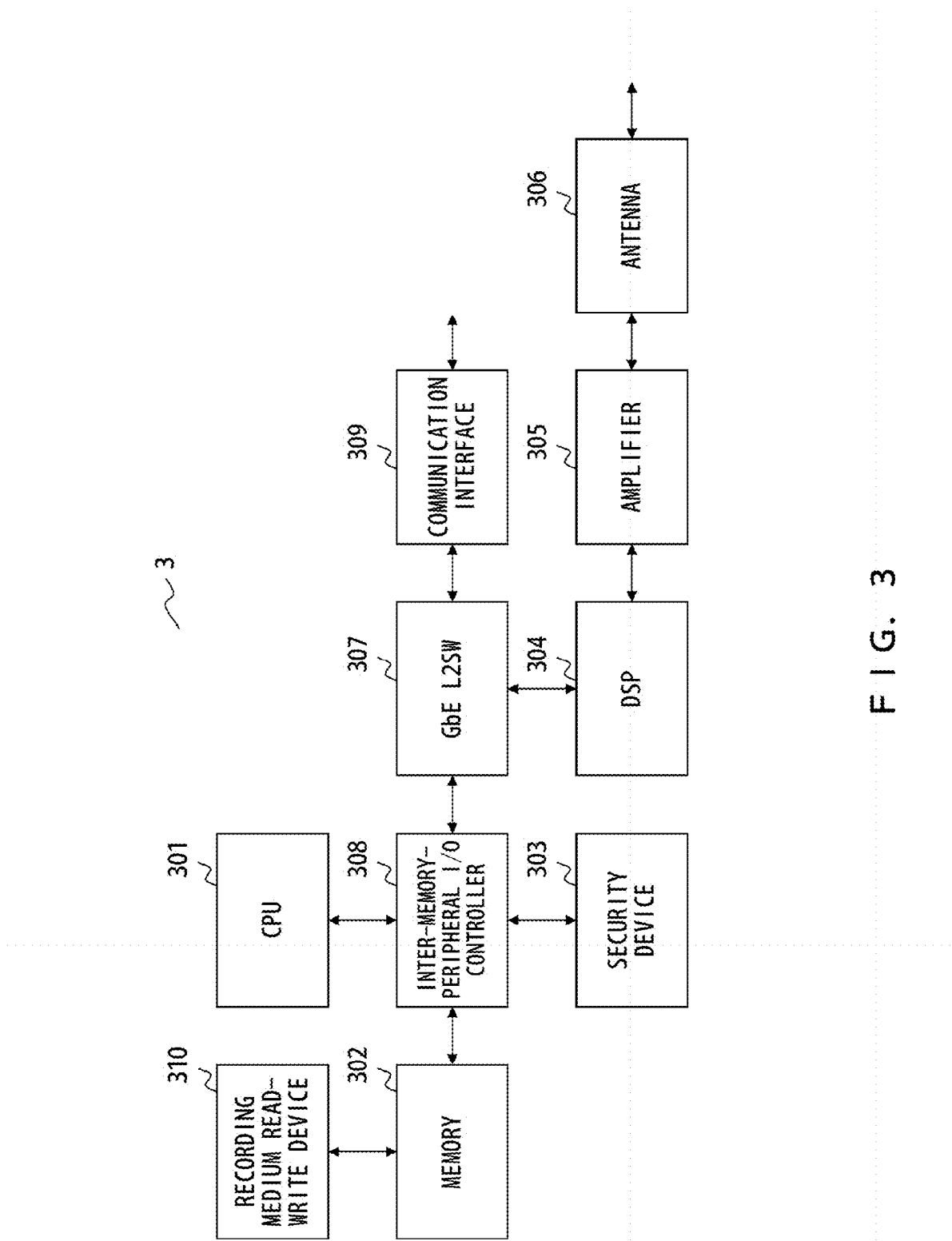
FIG. 3 is an exemplary hardware configuration of a wireless base station device.

FIG. 3 is an exemplary hardware configuration of a wireless base station device. As illustrated in FIG. 3, the wireless base station device 3 includes a CPU 301, memory 302, a security device 303, a DSP 304, an amplifier 305, an antenna 306, a GbE L2SW 307, an inter-memory-peripheral I/O controller 308, a communication interface 309, and a recording medium read-write device 310.

The CPU 301 controls the operation of the entire wireless base station device 3. The memory 302 includes a main memory device such as a RAM, a ROM, etc. and an auxiliary storage device such as an HDD etc. The security device 303 encrypts the data to be transmitted to an external device, and decrypts the data received from the external device. The DSP 304 is a radio signal processing module which converts a cable signal processed by the CPU 301 and/or the security device 303 into a radio signal, and converts a radio signal received from the wireless communication terminal device 2 via the antenna 306 and the amplifier 305 into a cable signal. The amplifier 305 amplifies the radio signal converted by the DSP 304 and outputs the amplified signal to the antenna 306, and amplifies the radio signal received via the antenna 306 and outputs the amplified signal to the DSP 304. The wireless base station device 3 transmits the radio signal to the wireless communication terminal device 2 via the antenna 306, and receives the radio signal transmitted from the wireless communication terminal device 2 via the antenna 306.

The GbE L2SW 307 recognizes the destination of a packet communicated between the device such as the CPU 301, the security device 303, etc. and the device such as the DSP 304, the communication interface 309, etc., and transfers the packet to the recognized destination device. The communication interface 309 functions as an interface of a cable signal communicated with an external device such as the gateway 4, a device in the core network 5, etc., and may be, for example, an Ethernet PHY device. The inter-memory-peripheral I/O controller 308 controls the input/output of data between a device such as the CPU 301, the security device 303, the GbE L2SW 307, etc. and the memory 302. The recording medium read-write device 310 reads a program and data stored in a recording medium, and writes the read program and data to the memory 302.

The gateway 4 relays a cable signal (packet) communicated between the wireless base station device 3 and a device within the core network 5.

FIG. 4 is an exemplary hardware configuration of a gateway. As illustrated in FIG. 4, the gateway 4 includes a CPU 401, memory 402, a security device 403, a GbE L2SW 404, an inter-memory-peripheral I/O controller 405, a communication interface 406, and a recording medium read-write device 407.

The CPU 401 controls the operation of the entire gateway 4. The memory 402 includes a main memory device such as a RAM, a ROM, etc. and an auxiliary storage device such as an HDD etc. The security device 403 encrypts the data to be transmitted to an external device, and decrypts the data received from the external device. The GbE L2SW 404 recognizes the destination of a packet communicated between a device such as the CPU 401, the security device 403, etc. and the communication interface 406, and transfers the packet to the recognized destination device. The communication interface 406 functions as an interface of a cable signal communicated with an external device such as the wireless base station device 3 and a device within the core network 5, and may be, for example, an Ethernet PHY device. The inter-memory-peripheral I/O controller 405 controls the input/output of the data between the device such as the CPU 401, the security device 403, the GbE L2SW 404, etc. and the memory 402. The recording medium read-write device 407 reads a program and data recorded in the recording medium, and writes the read program and data to the memory 402.

The core network 5 is, for example, an evolved packet core (EPC) defined by the technical standard specification of the 3GGP. The core network 5 includes, for example, a mobility management entity (MME), a serving gateway (S-GW), and a packet data network gateway (P-GW). The MME transmits a packet of a control signal through a control plane (C-plane). The S-GW transmits a packet of a user data signal through a user plane (U-plane). The P-GW makes a connection to an external network such as the Internet etc. To an external network connected to the core network 5, a server device capable of communicating data with the wireless communication terminal device 2 such as a contents server etc. may be connected. The external network is, for example, the Internet.

In an example illustrated in FIG. 1, the wireless base station device 3 and the gateway 4 include the encrypted communication device 6 according to the first embodiment. The wireless base station device 3 including the encrypted communication device 6 may encrypt and decrypt a packet communicated with the gateway 4 according to the encrypted communication method of the first embodiment. Furthermore, the gateway 4 including the encrypted communication device 6 may encrypt and decrypt the packet communicated with the wireless base station device 3 according to the encrypted communication method of the first embodiment. Then, as illustrated in FIG. 1, a tunnel 7 is established as a path through which an encrypted packet is transmitted between the wireless base station device 3 and the gateway 4, and an encrypted communication may be performed between the wireless base station device 3 and the gateway 4. In FIG. 1, the tunnel 7 is illustrated between the wireless base station device 3-1 and the gateway 4, but the tunnel 7 may also be established between the wireless base station device 3-2 and the gateway 4.

The tunnel 7 includes a common tunnel 7A and one or more dedicated tunnels 7B associated with the same security policy (SP) as the common tunnel 7A. The SP refers to the policy of a communication process for a packet as to whether an encrypted communication is performed, an encrypted communication is not performed, a packet is discarded, etc. The SP is determined using the source address of a packet, the destination address of a packet, the protocol, etc. as a selection standard. The selection standard of a communication process is referred to as a selector.

In the present specification, the common tunnel 7A refers to a tunnel through which an encrypted packet obtained by encrypting data in a packet targeted for transmission which is to be transmitted to the opposite encrypted communication device 6. The dedicated tunnel 7B refers to a tunnel through which an encrypted packet obtained by encrypting remaining data which is obtained by deleting a data portion that matches matching data described later from the data in the packet targeted for transmission. The payload of the encrypted packet which is transmitted through the dedicated tunnel 7B is configured by the remaining data in the packet targeted for transmission. Therefore, as compared with the case in which the packet targeted for transmission is transmitted through the common tunnel 7A, the traffic is low in the case in which the packet targeted for transmission is transmitted through the dedicated tunnel 7B. The encrypted packet transmitted through the common tunnel 7A and the dedicated tunnel 7B may be, for example, an encapsulating security payload (ESP) packet.

FIG. 1 illustrates one common tunnel 7A. However, the number of common tunnels 7A generated between a plurality of devices including the encrypted communication device 6 may be a plural depending on the destination address etc. of a packet to be communicated between a plurality of encrypted communication devices 6.

Figure 5:
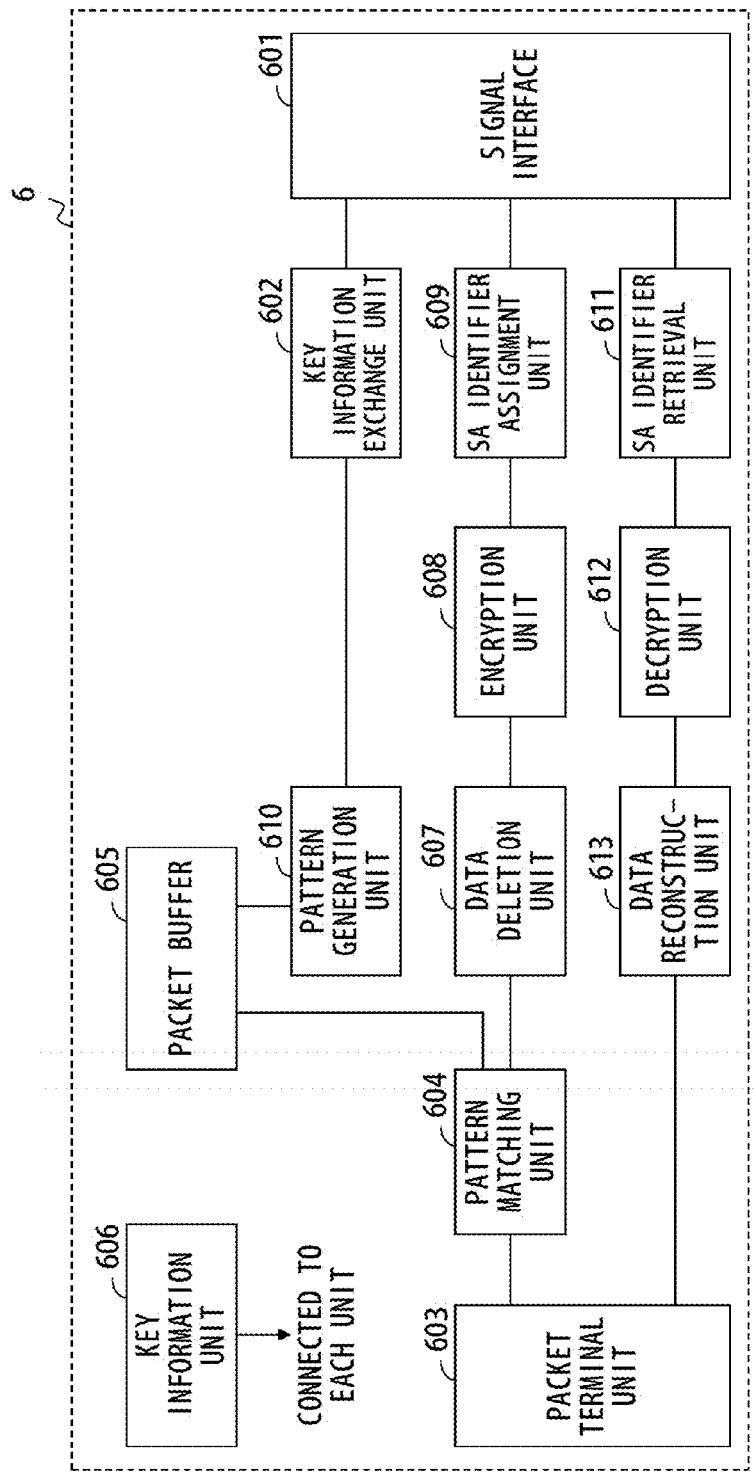
FIG. 5 illustrates an exemplary functional configuration of an encrypted communication device according to the first embodiment of the present invention.

FIG. 5 illustrates an exemplary functional configuration of an encrypted communication device according to the first embodiment of the present invention. As illustrated in FIG. 5, the encrypted communication device 6 includes a signal interface 601, a key information exchange unit 602, a packet terminal unit 603, a pattern matching unit 604, a packet buffer 605, a key information unit 606, a data deletion unit 607, an encryption unit 608, a security association (SA) identifier assignment unit 609, a pattern generation unit 610, an SA identifier retrieval unit 611, a decryption unit 612, and a data reconstruction unit 613.

The encrypted communication device 6 is, for example, a device capable of performing a communication according to the IPsec. However, the encrypted communication device 6 may perform a communication according to any security protocol which may establish an encrypted communication in an IP layer (layer 3) lower than the application software.

The signal interface 601 communicates an IP packet with an opposite device. The key information exchange unit 602 communicates with an opposite device an encryption key exchange packet via the signal interface 601, and establishes a security association (SA). In addition, the key information exchange unit 602 generates, updates, and deletes an SA including the key data. The SA is a rule relating to an encrypted communication through the tunnel 7, and includes a defined security parameter, such as an encryption algorithm and an encryption key etc., which is used during the encrypted communication. An encryption key exchange packet is, for example, an Internet key exchange (IKE) packet.

When establishing an SA relating to the common tunnel 7A with an opposite device, the key information exchange unit 602 confirms with the opposite device whether or not the opposite device is the encrypted communication device 6 capable of performing the encrypted communication through the dedicated tunnel 7B. When it is confirmed that the opposite device is the encrypted communication device 6 capable of performing the encrypted communication through the dedicated tunnel 7B, the key information exchange unit 602 establishes the SA relating to the dedicated tunnel 7B with the opposite device. That is, the key information exchange unit 602 communicates with the opposite encrypted communication device 6 the necessary data for the encrypted communication through the dedicated tunnel 7B using the key information exchange packet. In addition, the key information exchange unit 602 registers in the key information unit 606 the necessary data for the encrypted communication through the dedicated tunnel 7B. The necessary data for the encrypted communication through the dedicated tunnel 7B includes key data, matching data indicating the data to be deleted from the packet targeted for transmission when the communication through the dedicated tunnel 7B is performed, and an SA identifier for identification of the SA relating to the dedicated tunnel 7B. The SA identifier is, for example, a security parameter index (SPI).

The packet terminal unit 603 terminates the transmission/reception packet with various types of protocol. For example, when the encrypted communication device 6 is included in the gateway 4, the packet terminal unit 603 is connected to the wireless base station device 3 as an external device via a cable line through the signal interface (not illustrated in the attached drawings) corresponding to the communication interface 406. Furthermore, when the encrypted communication device 6 is included in the wireless base station device 3, the packet terminal unit 603 may be connected to the wireless communication terminal device 2 as an external device via a wireless line through a radio signal processing unit (not illustrated in the attached drawings) corresponding to the DSP 304 and the amplifier 305. The packet terminal unit 603 terminates a plaintext packet communicated with the above external devices.

The packet received by the packet terminal unit 603 from the external device may be a packet targeted for transmission to the opposite encrypted communication device 6. Furthermore, a packet to be transmitted by the packet terminal unit 603 to an external device may be a packet obtained by decrypting and reconstructing the encrypted packet received from the opposite encrypted communication device 6.

The pattern matching unit 604 receives from the packet terminal unit 603 the packet targeted for transmission to the opposite encrypted communication device 6, and stores the received packet in the packet buffer 605. FIG. 5 illustrates one packet buffer 605. However, there may be a plurality of packet buffers in the encrypted communication device 6, and may be configured so that a packet may be stored separately in a plurality of packet buffers according to a packet length, a communication protocol, a communication section (source address, destination address), etc.

The pattern matching unit 604 retrieves from the key information unit 606 the SA including matching data whose data pattern matches at least apart of data in the packet targeted for transmission to the opposite encrypted communication device 6. The matching of a "data pattern" or a "pattern" refers to, for example, the matching of "the position (offset value) of the data in the packet, the size of the data, and the contents of the data".

When the SA including matching data whose data pattern is matching is retrieved, the data deletion unit 607 deletes the data portion which matches the matching data from the packet targeted for transmission. The encryption unit 608 encrypts the remaining data in the packet targeted for transmission whose data portion matching the matching data is deleted, according to the key data of the retrieved SA. The SA identifier assignment unit 609 assigns an SA identifier of the retrieved SA to the encrypted packet in which the remaining data of the encrypted data by the encryption unit 608 is a payload, and generates an encrypted packet. The SA identifier assignment unit 609 transmits the generated encrypted packet to the opposite encrypted communication device 6 via the signal interface 601.

The pattern generation unit 610 compares the packet targeted for transmission which is newly stored in the packet buffer 605 by the pattern matching unit 604 with the other packets which are already stored in the packet buffer 605. In the present specification, the other packets already stored in the packet buffer 605 are referred to as sample packets.

The pattern generation unit 610 extracts from the packet targeted for processing the data portion whose data pattern matches at least a part of data in the sample packet, and generates matching data indicating an extracted data portion. When matching data is generated, the pattern generation unit 610 judges that it is necessary to generate the dedicated tunnel 7B for performing an encrypted communication of remaining data in the packet targeted for processing in which the portion matching the matching data has been deleted, and instructs the key information exchange unit 602 to generate the SA relating to the dedicated tunnel 7B. Upon receipt of the instruction, the key information exchange unit 602 establishes the SA relating to the dedicated tunnel 7B with the encrypted communication device 6, and registers in the key information unit 606 the SA data relating to the dedicated tunnel 7B including the matching data generated by the pattern generation unit 610.

The SA identifier retrieval unit 611 receives the encrypted packet transmitted from the opposite encrypted communication device 6, via the signal interface 601. The SA identifier retrieval unit 611 retrieves the SA identifier from the received encrypted packet, and specifies the SA of the received encrypted packet. The decryption unit 612 acquires the key data of the SA specified by the SA identifier retrieval unit 611 from the key information unit 606, and decrypts the encrypted packet according to the acquired key data.

When the SA specified by the SA identifier retrieval unit 611 is an SA relating to the dedicated tunnel 7B, the data reconstruction unit 613 acquires the matching data of the specified SA from the key information unit 606. The data reconstruction unit 613 inserts the data portion indicated by the acquired matching data into the data in the decrypted packet, and reconstructs the decrypted packet to the packet in the state before the deletion of the data by the opposite encrypted communication device 6. The packet terminal unit 603 receives the packet reconstructed by the data reconstruction unit 613. The received packet is transmitted to the destination device of the packet through, for example, the signal interface (not illustrated in the attached drawings) connected to the packet terminal unit 603 or the radio signal processing unit (not illustrated in the attached drawings). Otherwise, the received packet is, for example, processed in the encrypted communication device 6.

FIG. 6 is an explanatory view of the database stored in a key information unit. As illustrated in FIG. 6, the key information unit 606 stores a security policy (SP) database SPD and an SA associated with the SP in the SP database SPD. The SA associated with the SP is stored in an SA database SAD of the key information unit 606. The SA database SAD is a database for management of the SA.

The SP database SPD is a database for management of the data relating to the SP. The SP data stored in the SP database SPD is data related to the policy for securing the packet, the policy not for securing the packet, and the policy for discarding the packet. Although FIG. 6 illustrates one SP database SPD, there may be a plurality of SP database included in the key information unit 606.

As illustrated in FIG. 6, the SA including the matching data are associated with the SP and stored in the key information unit 606. Therefore, when the encrypting process is performed, the retrieval range of the SA is narrowed according to the specification of the SP corresponding to the packet targeted for transmission. Accordingly, the matching data to be compared with the data in the packet targeted for transmission may be quickly retrieved.

In addition, as illustrated in FIG. 6, when the rekey process is performed by the key information exchange unit 602, a new SA (SA' in FIG. 6) is generated for the SA stored in the key information unit 606. The key information exchange unit 602 copies the matching data of the existing SA, and stores the copied matching data as the matching data of a new SA. Therefore, the matching data of the existing SA is the same as the matching data of the newly generated SA during the rekey process. After the new SA is generated, the precedent SA is deleted by the key information exchange unit 602 after the lapse of specified time and/or after processing a specified number of IP packets. Thus, since the existing matching data is handed over during the rekey process, there is no process load for generating similar matching data. In addition, since an encrypted communication is performed after the rekey process by using the SA including the existing matching data, there is no inconvenience of increasing traffic in a communication system after the rekey process.

FIG. 7 illustrates an exemplary configuration of an SA. As illustrated in FIG. 7, the SA includes key data, matching data, and an SA identifier. Although FIG. 7 illustrates one SA including key data, matching data, and an SA identifier, a plurality of SAs may be included in the SA database SAD of the key information unit 606. The SA may be configured to be classified by a source address, a destination address, a data size of data indicated by matching data, a communication protocol, a port number, etc., and be stored in the SA database SAD. With the configuration above, the SA including the matching data whose data pattern matches the data in the packet targeted for transmission may be easily retrieved, and the processing speed in the matching process by the pattern matching unit 604 may be improved.

The key data includes the data relating to an encryption key, a key length, and an encryption algorithm. The key data of the SA relating to the dedicated tunnel 7B may be the same as the key data of the SA relating to the common tunnel 7A associated with the same SP. The SA identifier is an identifier for identification of an SA, and may be, for example, an SPI. The matching data is data related to the data portion to be deleted from a packet targeted for transmission when the packet targeted for transmission is transmitted through the dedicated tunnel 7B of the SA. Furthermore, the matching data is data related to the data portion to be inserted into the decrypted packet after the encrypted packet transmitted through the dedicated tunnel 7B of the SA has been decrypted.

Figure 8B:
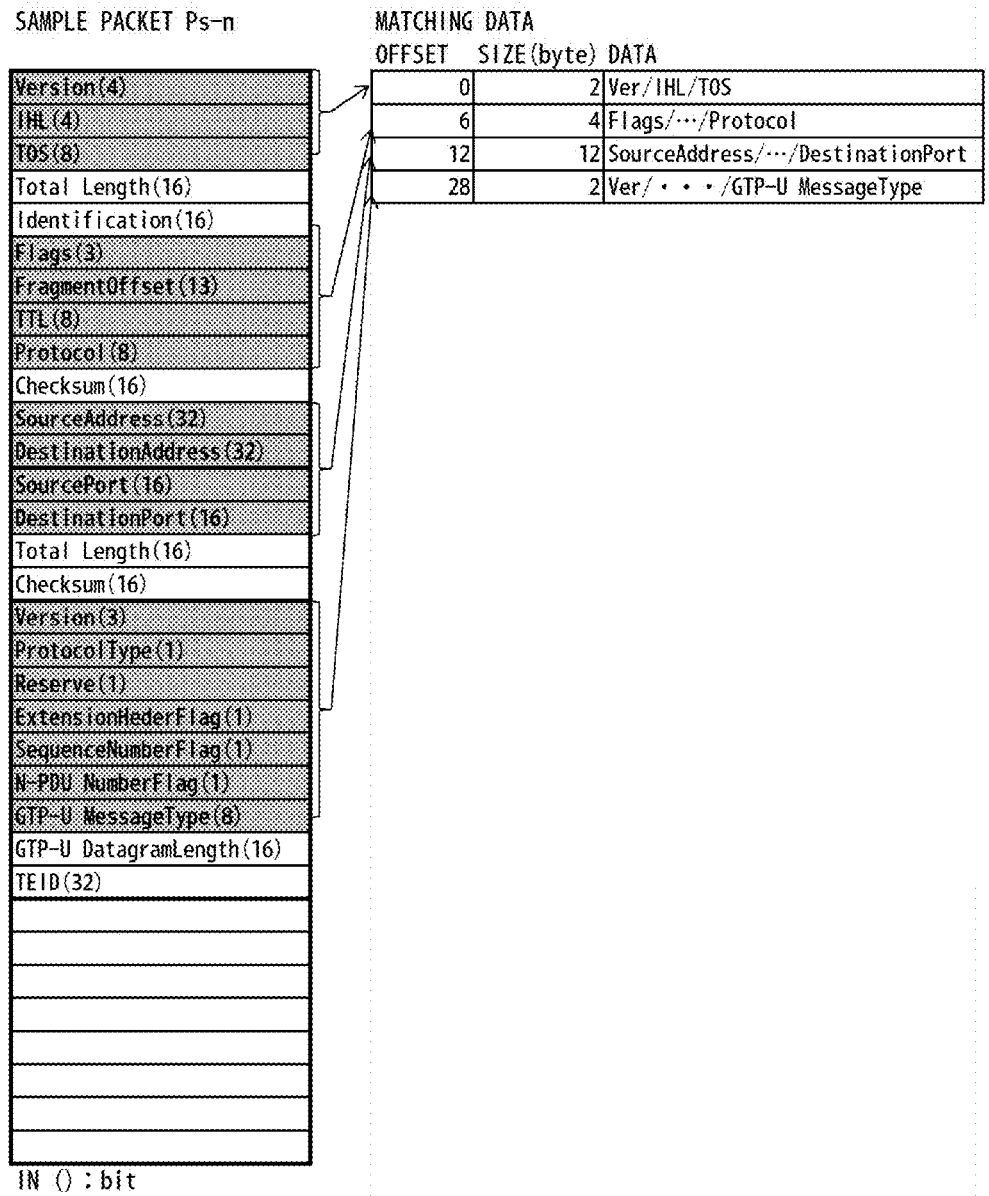
FIG. 8B is an explanatory view of exemplary matching data.

FIGS. 8A and 8B are explanatory views of exemplary matching data. As illustrated in FIGS. 8A and 8B, the data pattern of the data in a packet targeted for processing Pt is compared by the pattern generation unit 610 with the data pattern of the data in n (n is an integer of 1 or more) sample packets Ps-1 through Ps-n stored in the packet buffer 605. When the dedicated tunnel generating process described later is performed concurrently with the encrypting process, the packet targeted for processing Pt is a packet targeted for transmission to the opposite encrypted communication device 6. Furthermore, when the dedicated tunnel generating process is performed concurrently with the decrypting process, the packet targeted for processing is a packet obtained by decrypting and reconstructing the encrypted packet received from the opposite encrypted communication device 6.

For example, as illustrated in FIGS. 8A and 8B, assume that the data pattern of the data of the hatching part in the packet targeted for processing Pt matches the data pattern of the data of the hatching part in the sample packets Ps-1 and Ps-n. In the example illustrated in FIGS. 8A and 8B, the matching data corresponding to the data of the matching part is generated by the pattern generation unit 610. The generated matching data includes, for example, the offset value from the leading byte of the packet targeted for processing to the leading byte of the data portion continuously recorded as matching data, the data size of the data portion, and the data contents of the data portion. As illustrated in FIG. 8B, a plurality of data portions continuously recorded as matching data may exist in the packet targeted for processing. The offset value, the data size, and the data contents included in the matching data are associated with one another for each dada-data portion, and are recorded.

Figure 9B:
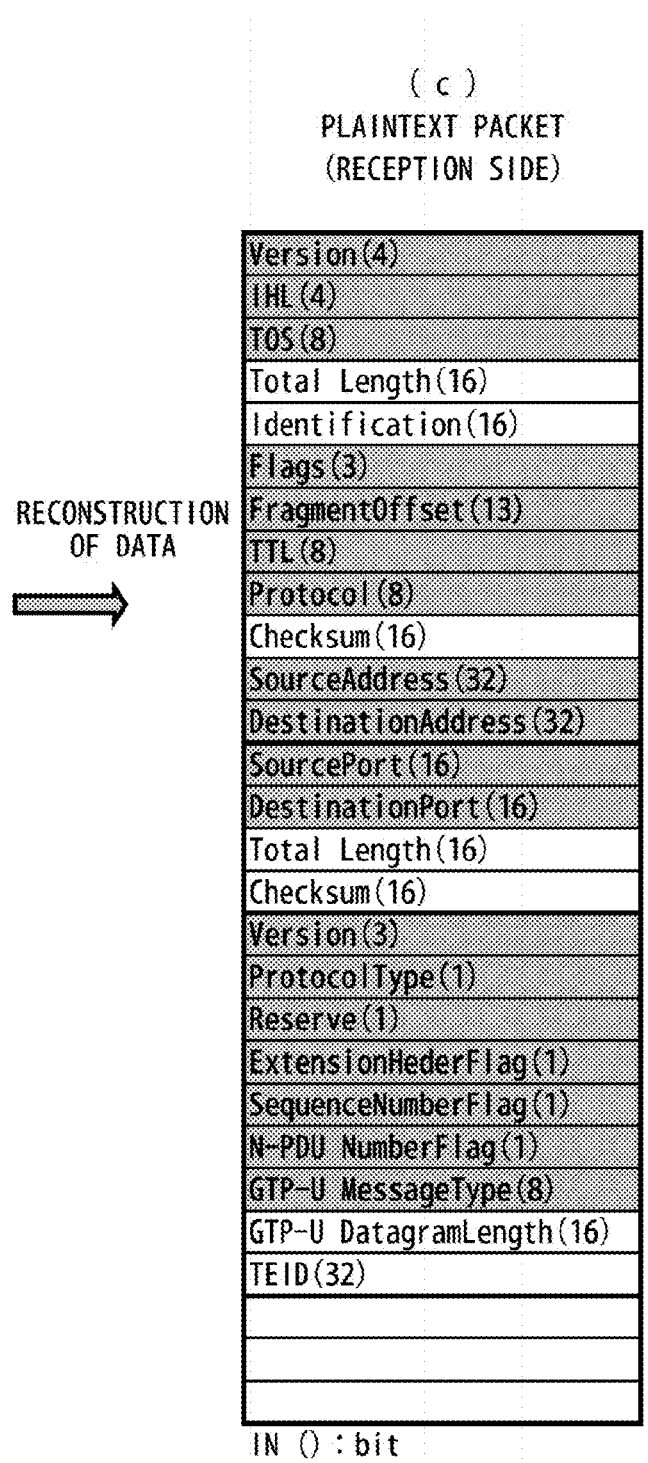
FIG. 9B is an explanatory view of an encrypted communication using illustrative matching data in FIG. 8B.

FIGS. 9A and 9B are explanatory views of an encrypted communication using illustrative matching data in FIG. 8B. The pattern matching unit 604 of the encrypted communication device 6 on the transmission side compares the data in the packet targeted for transmission with the matching data of the SA stored in the key information unit 606. In an example illustrated in FIG. 9, it is judged that the data pattern of a part of data in the data ((a) in FIG. 9A) of the packet targeted for transmission matches the data pattern of the matching data illustrated in FIG. 8B. In this example, the data deletion unit 607 of the encrypted communication device 6 on the transmission side deletes the data portion that matches the matching data in the data ((a) in FIG. 9A) in the packet targeted for transmission.

The data illustrated in (b) in FIG. 9A refers to the remaining data in which the portion matching the matching data in the data ((a) in FIG. 9A) of the packet targeted for transmission has been deleted. The encryption unit 608 encrypts only the remaining data ((b) in FIG. 9A) as the payload of the encrypted packet, and the SA identifier assignment unit 609 assigns an SA identifier to the encrypted payload, thereby generating an encrypted packet. Then, the generated encrypted packet is transmitted to the encrypted communication device 6 via the signal interface 601.

Thus, in the encrypted communication method according to the first embodiment, when an encrypted communication is performed according to the SA including matching data, only the remaining data is encrypted, thereby reducing the process load of the device which performs the encrypting process. Furthermore, the payload of the encrypted packet according to the SA including the matching data is only the remaining data described above. Therefore, by using the encrypted packet according to the SA including the matching data in a communication, the traffic in a communication system may be reduced more than in the case in which an encrypted packet generated as a payload the original data ((a) in FIG. 9A) in the packet targeted for transmission is communicated.

The encrypted packet in which a payload is the remaining data ((b) in FIG. 9A) is received via the signal interface 601 of the encrypted communication device 6 on the reception side. After the SA identifier retrieval unit 611 specifies the SA of the received encrypted packet, the decryption unit 612 decrypts the received packet. Then, the data reconstruction unit 613 inserts the matching data of the SA specified by the SA identifier retrieval unit 611 into the decrypted packet, and reconstructs the decrypted packet into the original data ((a) in FIG. 9A) of the packet targeted for transmission. The part (c) in FIG. 9B refers to the data in the reconstructed packet.

Thus, in the encrypted communication method according to the first embodiment, since the original data in the packet targeted for transmission may be reconstructed by a device on the reception side, a communication may be performed with the security of the data ensured in the packet targeted for transmission although a part of the data in the packet targeted for transmission is not transmitted in a device on the transmission side.

Described below is an example of a process flow of the encrypted communication performed by the encrypted communication device 6. The encrypted communication processing performed by the encrypted communication device is roughly classified into an encrypting process, a decrypting process, and a dedicated tunnel generating process. Furthermore, in the encrypted communication processing according to the first embodiment, the dedicated tunnel generating process is concurrently performed with the encrypting process.

FIG. 10 illustrates an exemplary flowchart of an encrypting process according to the first embodiment of the present invention.

In step S101, the packet terminal unit 603 receives a plaintext packet targeted for transmission. As described above, the packet targeted for transmission which is received by the packet terminal unit 603 may be, for example, a plaintext packet received from an external device via a signal interface (not illustrated in the attached drawings) connected to the packet terminal unit 603 or via a radio signal processing unit (not illustrated in the attached drawings). In addition, a packet targeted for transmission which is received by the packet terminal unit 603 may be, for example, a plaintext packet generated in the encrypted communication device 6. The packet terminal unit 603 transmits the received packet targeted for transmission to the pattern matching unit 604.

The pattern matching unit 604 receives the packet targeted for transmission from the packet terminal unit 603. The pattern matching unit 604 retrieves the SP recorded in the SP database SPD of the key information unit 606, and specifies the SP corresponding to the packet targeted for transmission (step S102). A selector value as a selection standard for specification of the SP may be, for example, a source IP address of a packet, a destination IP address, a protocol, a port number, etc. The pattern matching unit 604 specifies the SP having the selector value that matches the packet targeted for transmission from among the SPs recorded in the SP database SPD.

The pattern matching unit 604 retrieves the SA including the matching data having the data pattern matching the data pattern of at least a part of data in the packet targeted for transmission, that is, the SA relating to the dedicated tunnel 7B, from among the SAs associated with the specified SP (step S103).

As a result of the retrieval, when there is no SA relating to the dedicated tunnel 7B ("NO" in step S104), the pattern matching unit 604 retrieves the SA relating to the common tunnel 7A associated with the specified SP from the SA database SAD (step S105). Then, the pattern matching unit 604 specifies the SA relating to the common tunnel 7A whose selector value matches the specified SP or the packet targeted for transmission according to the selection policy of the SA indicated by the specified SP.

On the other hand, as a result of the retrieval, when there is an SA relating to the dedicated tunnel 7B (YES in step S104), the data deletion unit 607 deletes the data portion indicated by the matching data of the SA specified by the retrieval from the packet targeted for transmission (step S106). If there are a plurality of SAs as a result of the retrieval, the pattern matching unit 604 selects the SA having the largest data size of the matching data, and deletes the data portion indicated by the matching data of the selected SA from the packet targeted for transmission.

The encryption unit 608 encrypts the data in the packet targeted for transmission according to the key data of the specified or selected SA (step S107). That is, when the SA relating to the common tunnel 7A is specified, the encryption unit 608 encrypts all data in the packet targeted for transmission which is determined depending on whether the encrypted communication mode of the specified SA is a tunnel mode or a transport mode. In the tunnel mode, the IP header of the packet targeted for transmission and the data of the layer 4 or more are encrypted. In the transport mode, the data of the layer 4 or more excluding the IP header of the packet targeted for transmission is encrypted. On the other hand, when SA relating to the dedicated tunnel 7B is specified or selected, the encryption unit 608 encrypts only the remaining data obtained as a result of deleting the same data portion as the matching data in all data in the packet targeted for transmission which is determined depending on whether the encrypted communication mode of the specified SA is the tunnel mode or the transport mode.

The SA identifier assignment unit 609 assigns the SA identifier to the encrypted packet having the data encrypted by the encryption unit 608 as a payload, and transmits the encrypted packet assigned the SA identifier via the signal interface 601 (step S107). Thus, a series of encrypting process for the packet targeted for transmission is terminated (S108).

On the other hand, after the SP retrieving process in step S102, the dedicated tunnel generating process is performed concurrently with the encrypting process in steps S103 through S108 (step S109). In the encrypted communication processing according to the first embodiment, since the dedicated tunnel generating process is performed concurrently with the encrypting process, as compared with the case in which the dedicated tunnel generating process is singly performed, the delay of the encrypting process may be suppressed. An example of the dedicated tunnel generating process in step S109 is described below with reference to FIG. 11.

FIG. 11 illustrates exemplary flowchart of a dedicated tunnel generating process.

When the dedicated tunnel generating process is started (step S201), the pattern matching unit 604 stores the packet targeted for processing in the packet buffer 605 (step S202). When the dedicated tunnel generating process is performed concurrently with the encrypting process as in the first embodiment, the packet targeted for processing is a packet targeted for transmission to the opposite encrypted communication device 6. When the number of packets stored in the packet buffer 605 exceeds a specified threshold, the packets are deleted from the packet buffer 605 in the order of earlier storage, and a packet targeted for processing is newly stored in the packet buffer 605.

The storing process in step S202 by the pattern matching unit 604 may be configured to performed at intervals of a specified number of packets. Furthermore, the storing process in step S202 may be configured not to be performed when a number of packets stored in the packet buffer 605 is exceeded a specified upper limit. When the storing process in step S202 is not performed, the dedicated tunnel generating process as illustrated in FIG. 11 is not performed. With this configuration, the process load of the encrypted communication device 6 by performing the dedicated tunnel generating process may be reduced.

After the storing process in step S202 is performed, the pattern generation unit 610 extracts from the packet buffer 605 a sample packet including the data whose data pattern best matches the data pattern of the data in the packet targeted for processing (step S203). In the data of the packet targeted for transmission, the data targeted for matching may be determined depending on whether the SA relating to the common tunnel 7A corresponding to the packet targeted for processing is the tunnel mode or the transport mode.

The pattern generation unit 610 judges whether or not the number of bytes of the data portion whose data pattern matches the data pattern of the extracted sample packet exceeds a matching data threshold (step S204). The matching data threshold refers to the minimum number of bytes (minimum data size) of the matching data with which it is judged that an encrypted communication may be effectively performed through the dedicated tunnel 7B by newly generating an SA, and is set as a fixed value in advance.

When it is judged that the number of matching data bytes is less than or equal to the matching data threshold ("NO" in step S204), the dedicated tunnel generating process is terminated (step S211). On the other hand, when it is judged that the number of matching data bytes exceeds a matching data threshold ("YES" in step S204), control is passed to step S205 in the dedicated tunnel generating process.

In step S205, the pattern generation unit 610 retrieves the SA including the matching data whose data pattern matches the data pattern of at least a part of data in the packet targeted for transmission from among the SAs associated with the SP corresponding to the packet targeted for processing. When the dedicated tunnel generating process is performed concurrently with the encrypting process as in the first embodiment, the pattern generation unit 610 may be configured to acquire the result of the retrieval in step S103 instead of the SA retrieving process by the pattern generation unit 610.

When no SA is retrieved or acquired in step S205 ("NO" in step S206), control is passed to step S208 in the dedicated tunnel generating process. On the other hand, when an SA is retrieved or acquired in step S205 ("YES" in step S206), control is passes to step S207 in the dedicated tunnel generating process.

In step S207, the pattern generation unit 610 judges whether or not the data size, that is, the number of bytes, of the data portion in the packet targeted for processing whose data pattern matches the data pattern of the sample packet extracted in step S203 exceeds the number of bytes indicated by the matching data of each retrieved SA.

When it is judged that the number of bytes of the matching data portion is less than or equal to the number of bytes of the matching data of each of the retrieved SAs ("NO" in step S207), it is acceptable that the encrypted communication is performed using an already registered SA, thereby terminating the dedicated tunnel generating process (step S211). On the other hand, when the number of bytes of a matching data portion exceeds the number of bytes of the matching data of each retrieved SA ("YES" in step S207), control is passed to step S208 in the dedicated tunnel generating process.

In step S208, the pattern generation unit 610 judges whether or not the number of sample packets including the data portion whose data pattern matches the data pattern of the sample packet extracted in step S203 exceeds a pattern generation threshold. The pattern generation threshold refers to the minimum number of sample packets stored in the packet buffer 605, which may be judged as efficiency when a new SA is generated and an encrypted communication is performed using the dedicated tunnel 7B, and is set in advance as a fixed value.

When it is judged that the number of sample packets is less than or equal to the pattern generation threshold ("NO" in step S208), the data portion in the packet targeted for processing whose data pattern matches the data pattern of the sample packet extracted in step S203 is judged as an incidental matching portion, and the dedicated tunnel generating process is terminated (step S211).

On the other hand, when it is judged that the number of sample packets exceeds the pattern generation threshold ("YES" in step S208), then the pattern generation unit 610 judges that it is necessary to generate the SA having as new matching data a data portion in the packet targeted for processing whose data pattern matches the data pattern of the sample packet extracted in step S203. Then, the pattern generation unit 610 instructs the key information exchange unit 602 to generate the SA.

The key information exchange unit 602 copies the key data of the SA relating to the common tunnel 7A associated with the SP corresponding to the packet targeted for processing. Then, the key information exchange unit 602 generates an SA including new matching data and the copied key data. The key information exchange unit 602 associates the generated SA with the SP corresponding to the packet targeted for processing, and stores it in the key information unit 606 (step S209).

The key information exchange unit 602 establishes the generated SA with the opposite encrypted communication device 6 (step S210). In particular, the key information exchange unit 602 transmits a key information exchange packet such as an IKE packet to the opposite encrypted communication device 6. The transmitted key information exchange packet includes the SA identifier of the SA relating to the common tunnel 7A and the matching data of the newly generated SA. The key information exchange unit 602 receives the key information exchange packet transmitted from the opposite encrypted communication device 6. The key received information packet includes an SA identifier of the new SA which has been generated by the opposite encrypted communication device 6. The key information exchange unit 602 stores the received SA identifier in the key information unit 606. Thus, as with the establishment of the SA relating to the common tunnel 7A, the SA relating to the dedicated tunnel 7B may be established using a key information exchange packet, thereby reducing the overhead occurring with the establishment of the SA relating to the dedicated tunnel 7B.

When the process in step S210 is terminated, a series of dedicated tunnel generating process is terminated (step S211).

When the dedicated tunnel generating process in step S109 is terminated, the dedicated tunnel generating process performed concurrently with the encrypting process is also terminated (step S110).

The dedicated tunnel generating process concurrently performed as an example described above may be configured not to be performed if a specified number of SAs including matching data have already been generated in the key information unit 606. With the above-mentioned configuration, the process load of the encrypted communication device 6 which occurs as a result of performing the dedicated tunnel generating process may be reduced.

In addition, when the SA including the matching data generated by the above-mentioned dedicated tunnel generating process is not used in the encrypting process for a specified period, the unused SA may be configured to be deleted by the pattern generation unit 610. Furthermore, when the SA including the matching data generated by the dedicated tunnel generating process is not used in the encrypting process for a specified number of packets, the unused SA may be configured to be deleted by the pattern generation unit 610. With the configuration above, even after generating the SA including the matching data, unnecessary SA may be deleted, thereby improving the process speed of the encrypting process such as the collating process of the matching data by the pattern matching unit 604 etc.

Furthermore, the above-mentioned dedicated tunnel generating process may also be configured as follows.

For example, before a call connection is started and a user data signal is communicated between a user device such as the wireless communication terminal device 2 etc. and a server device in the core network 5 such as a contents server etc., a control signal is communicated between the user device and the device in the core network 5. A user data signal is an IP packet including user data, and is, for example, a U-plane signal. A control signal is an IP packet including control data, and is, for example, a C-plane signal.

The control signal may include data having the same data pattern as the data included in the user data signal communicated after communication of the control signal. In addition, the user data signal first communicated may include the data having the same data pattern as the data included in the user data signal communicated next. Therefore, the dedicated tunnel generating process in which the SA including matching data is generated based on the control signal or the first communicated user data signal may be performed before performing the dedicated tunnel generating process as illustrated in FIG. 11. Otherwise, instead of the performance of the dedicated tunnel generating process as illustrated in FIG. 11, the dedicated tunnel generating process in which the SA including the matching data is generated based on the control signal or the first communicated user data signal may be performed.

In the dedicated tunnel generating process described above with reference to FIG. 11, matching data is generated by comparing a plurality of packets. On the other hand, when matching data is generated based on the control signal or the first communicated user data signal, the matching data is generated based on one packet.

Figure 12A:
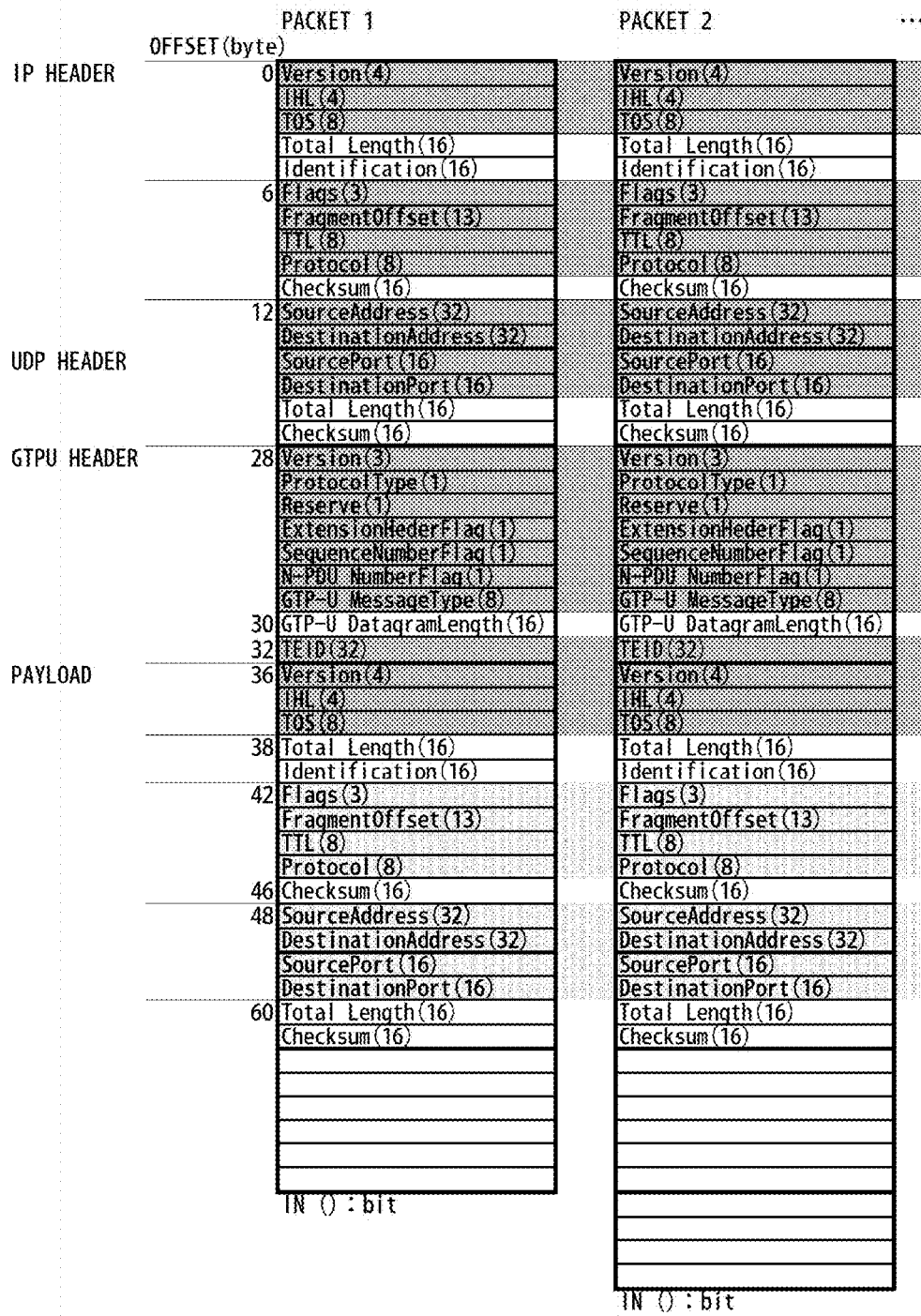
FIG. 12A is an explanatory view of exemplary matching data generated based on one packet.

FIGS. 12A and 12B are explanatory views of exemplary matching data generated based on one packet. A packet 1 illustrated in FIG. 12A is a first communicated user data signal. Packets 2 through n illustrated in FIGS. 12A and 12B are user data signals communicated after communication of packet 1.

In the packets 1 through n, a part of data of the header portion such as an IP header, a user datagram protocol (UDP) header, a general packet radio service tunneling protocol (GTPU) user plane (GTPU) header, etc. is hatched. In addition, a part of data of a payload such as a version, an IHL, a TOS, etc. is hatched as with the hatched part of data of the header portion. The hatched data portion (hatched portion 1 illustrated in FIGS. 12A and 12B) of the packets 1 through n is the portion whose data pattern matches the data of the header portion of the control signal. Then, as illustrated in FIG. 12B, the matching data 1 for the hatched portion 1 may be generated in advance based on the data of the control signal communicated before communication of the packets 1 through n. The data about generation target as to which data portion is targeted for generation of matching data based on one packet may be set in advance.

In the packets 1 through n, a part of data of the payload is hatched using a hatching pattern different from the hatched portion 1. The hatched data portion (hatched portion 2 illustrated in FIGS. 12A and 12B) of the packets 1 through n may be extracted as a data portion whose data pattern matches by comparing the data in a plurality of packets. Then, as illustrated in FIG. 12B, the matching data 2 for the hatched portion 2 may be generated by the dedicated tunnel generating process described above with reference to FIG. 11.

By performing the above-mentioned dedicated tunnel generating process along with the dedicated tunnel generating process described above with reference to FIG. 11, or instead of the dedicated tunnel generating process described above with reference to FIG. 11, an SA including the matching data may be generated at a time when the control signal or the first user data signal is communicated. Furthermore, from the time point when the first user data signal is communicated, an encrypted communication may be performed through the dedicated tunnel 7B of the generated SA. Therefore, from the time point when the first user data signal is communicated, the encrypted communication may be performed while reducing the traffic in the communication system.

FIG. 13 illustrates an exemplary flowchart of a decrypting process according to the first embodiment of the present invention.

The SA identifier retrieval unit 611 receives an encrypted packet transmitted from the opposite encrypted communication device 6 via the signal interface 601 (step S301). The SA identifier retrieval unit 611 acquires an SA identifier of the received encrypted packet, and specifies an SA corresponding to the encrypted packet with reference to the SA identifier stored in the key information unit 606 and the acquired SA identifier (step S302). Then, the SA identifier retrieval unit 611 judges whether or not the specified SA is an SA relating to the dedicated tunnel 7B (step S303).

When it is judged that the specified SA is not an SA relating to the dedicated tunnel 7B ("NO" in step S303), the decryption unit 612 decrypts the received encrypted packet according to the key data of the specified SA (step S304).

On the other hand, when it is judged that the specified SA is an SA relating to the dedicated tunnel 7B ("YES" in step S303), the decryption unit 612 decrypts the received encrypted packet according to the key data of the specified SA (step S305). Then, the data reconstruction unit 613 inserts the data portion indicated by the matching data of the specified SA into the decrypted packet, and reconstructs the decrypted packet (step S306).

The packet terminal unit 603 receives the packet decrypted in step S304 or the packet reconstructed in step S305. Then, the packet terminal unit 603 transmits the received packet toward the destination device indicated by the IP header of the packet (step S307). When the process in step S307 is terminated, a series of the decrypting process is terminated (step S308).

Thus, the encrypted communication device on the transmission side according to the first embodiment may encrypt the remaining data excluding the data portion whose data pattern matches the data pattern of the matching data in the data of the packet targeted for transmission. Therefore, according to the encrypted communication device in the first embodiment, the load of the encrypting process of the device on the transmission side may be reduced. Furthermore, since the payload of the encrypted packet encrypted according to the SA including the matching data is configured by the remaining data, the traffic in the communication system may be reduced.

The encrypted communication device on the reception side according to the first embodiment may reconstruct the original data of the packet targeted for transmission. Therefore, according to the encrypted communication device in the first embodiment, a communication in which the security of the data in the packet targeted for transmission is guaranteed may be realized even when a part of data in the packet targeted for transmission is not transmitted by using the encrypted packet.

Described below is an example of the encrypted communication processing sequence by the communication system 1 including the encrypted communication device 6 according to the first embodiment. As described above, in an example in FIG. 1, the encrypted communication device 6 is included in the wireless base station device 3 and the gateway 4.

When the encrypted communication device 6 is included in the wireless base station device 3, the signal interface 601 corresponds to the communication interface 309. The key information exchange unit 602, the packet terminal unit 603, the pattern matching unit 604, the data deletion unit 607, the SA identifier assignment unit 609, the pattern generation unit 610, the SA identifier retrieval unit 611, and the data reconstruction unit 613 correspond to the CPU 301. The packet buffer 605 and the key information unit 606 correspond to the memory 302. The encryption unit 608 and the decryption unit 612 correspond to the security device 303.

When the encrypted communication device 6 is included in the gateway 4, the signal interface 601 correspond to the communication interface 406. The key information exchange unit 602, the packet terminal unit 603, the pattern matching unit 604, the data deletion unit 607, the SA identifier assignment unit 609, the pattern generation unit 610, the SA identifier retrieval unit 611, and the data reconstruction unit 613 correspond to the CPU 401. The packet buffer 605 and the key information unit 606 correspond to the memory 402. The encryption unit 608 and the decryption unit 612 correspond to the security device 403.

FIGS. 14A through 14D are exemplary sequence diagrams of encrypted communication processing of a communication system according to the first embodiment of the present invention.

The key information exchange unit 602 of the wireless base station device 3 communicates a key information exchange packet with the key information exchange unit 602 of the gateway 4 (processes p101 and p102), and establishes with the gateway 4 the SA relating to the encrypted communication through the common tunnel 7A. The key information exchange unit 602 of the wireless base station device 3 and the gateway 4 stores the established SA in the key information unit 606.

The packet terminal unit 603 receives a user data signal from the wireless communication terminal device 2 (process p103). In the example illustrated in FIG. 14A, the user data signal received in the process p103 includes data "abcD1".

In the process p104, the pattern matching unit 604 stores the received user data signal in the packet buffer 605. In addition, the pattern matching unit 604 retrieves the SA associated with the SP of the received user data signal from the key information unit 606, and judges whether or not there is an SA including the matching data whose data pattern matches the data pattern of the data in the received user data signal.

In the example illustrated in FIG. 14A, there is no SA including the matching data in the key information unit 606. Therefore, the encryption unit 608 encrypts the data "abcD1" in the received user data signal according to the key data of the SA relating to the common tunnel 7A. The SA identifier assignment unit 609 generates an encrypted packet which includes the data "abcD1" and is assigned the SA identifier, and transmits the generated encrypted packet to the gateway 4 via the signal interface 601.

In addition, concurrently with the encrypting process in the process p104 by the pattern matching unit 604, the encryption unit 608, and the SA identifier assignment unit 609, the pattern generation unit 610 starts the dedicated tunnel generating process. The pattern generation unit 610 compares the user data signal newly stored in the packet buffer 605 by the pattern matching unit 604 with the sample packet stored in the packet buffer 605. Then, the pattern generation unit 610 judges whether or not the ratio of the matching portion of the data pattern of a plurality of compared packets exceeds a specified threshold which is judged as effective in performing an encrypted communication using the dedicated tunnel 7B in which the matching portion is defined as matching data.

In the example illustrated in FIG. 14A, there is no sample packet stored in the packet buffer 605. Then, it is judged that the ratio is less than or equal to the threshold, and the matching data for the data "abcD1" of the received user data signal is not generated.

The SA identifier retrieval unit 611 of the gateway 4 receives the encrypted packet which includes the data "abcD1" and which is transmitted from the wireless base station device 3, via the signal interface 601 (process p105). The SA identifier retrieval unit 611 refers to the SA identifier of the received encrypted packet, and specifies the SA of the received encrypted packet. In the example illustrated in FIG.

14A, the specified SA is a SA regarding the common tunnel 7A. The received encrypted packet is decrypted by the decryption unit 612 according to the key data of the specified SA, and is transmitted to the core network 5 by the packet terminal unit 603 (process p106).

The packet terminal unit 603 of the wireless base station device 3 receives a user data signal from the wireless communication terminal device 2 (process p107). In the example illustrated in FIG. 14B, the user data signal received in the process p107 includes data "abcE2".

In the process p108, the pattern matching unit 604 stores the received user data signal in the packet buffer 605. Furthermore, the pattern matching unit 604 retrieves the SA associated with the SP of the received user data signal from the key information unit 606, and judges whether or not there is an SA including the matching data whose data pattern matches the data pattern of the data in the received user data signal.

In the example in FIG. 14B, there is no SA including the matching data in the key information unit 606. Then, the encryption unit 608 encrypts the data "abcE2" in the received user data signal according to the key data of the SA relating to the common tunnel 7A. The SA identifier assignment unit 609 generates an encrypted packet which includes the data "abcE2" and is assigned an SA identifier, and transmits the generated encrypted packet to the gateway 4 via the signal interface 601.

The SA identifier retrieval unit 611 of the gateway 4 receives the encrypted packet which includes the data "abcE2" and which is transmitted from the wireless base station device 3, via the signal interface 601 (process p109). The SA identifier retrieval unit 611 refers to the SA identifier of the received encrypted packet, and specifies the SA of the received encrypted packet. In the example illustrated in FIG. 14B, the specified SA is an SA relating to the common tunnel 7A. The received encrypted packet is decrypted by the decryption unit 612 according to the key data of the specified SA, and transmitted to the core network 5 by the packet terminal unit 603 (process p110).

In addition, concurrently with the encrypting process in the process p108 by the pattern matching unit 604, the encryption unit 608, and the SA identifier assignment unit 609, the pattern generation unit 610 of the wireless base station device 3 starts the dedicated tunnel generating process. The pattern generation unit 610 compares the user data signal newly stored in the packet buffer 605 by the pattern matching unit 604 with the sample packet already stored in the packet buffer 605. Then, the pattern generation unit 610 judges whether or not the ratio of the matching portions of the data patterns of the compared packets exceeds the specified threshold with which it is judged that the encrypted communication is efficiently using the dedicated tunnel 7B in which the matching portion is defined as matching data.

In the example illustrated in FIG. 14B, the data "abcE2" of the user data signal is compared with the data "abcD1" of the sample packet. Since the data portions "abc" match each other, and the data positions "abc" of all sample packets stored in the key information unit 606 match, it is judged that the execution of the encrypted communication using the SA in which "abc" is defined as matching data is efficient. Then, the pattern generation unit 610 instructs the key information exchange unit 602 to generate an SA in which "abc" is defined as matching data.

Upon receipt of the instruction, the key information exchange unit 602 communicates a key information exchange packet with the key information exchange unit 602 of the gateway 4 (processes p111 and p112), and establishes with the gateway 4 the SA in which "abc" is defined as matching data.

In particular, the key information exchange unit 602 of the wireless base station device 3 generates a key information exchange packet including the SA identifier of the SA relating to the common tunnel 7A and the matching data "abc", and transmits the generated key information exchange packet to the gateway 4. The key information exchange unit 602 of the gateway 4 receives the key information exchange packet transmitted from the wireless base station device 3, and acquires the SA identifier and the matching data "abc" from the received key information exchange packet. The key information exchange unit 602 of the gateway 4 generates a SA identifier for the SA including the matching data "abc", and generates a key information exchange packet including the generated SA identifier. Then, the key information exchange unit 602 of the gateway 4 transmits the generated key information exchange packet to the wireless base station device 3. The key information exchange unit 602 of the wireless base station device 3 and the gateway 4 stores the data of the established SA in the key information unit 606. In the above-mentioned process, the SA in which "abc" is defined as matching data is established between the wireless base station device 3 and the gateway 4.

The packet terminal unit 603 of the wireless base station device 3 receives a user data signal from the wireless communication terminal device 2 (process p113). In the example illustrated in FIG. 14B, the user data signal received in the process p113 includes data "abcF3".

In the process p114, the pattern matching unit 604 stores the received user data signal in the packet buffer 605. Furthermore, the pattern matching unit 604 retrieves the SA associated with the SP of the received user data signal from the key information unit 606, and judges whether or not there is a SA including the matching data whose data pattern matches the data pattern of the data in the received user data signal.

In the example illustrated in FIG. 14B, there is the SA including the matching data "abc" whose data pattern matches in the key information unit 606. Then, the SA including the matching data "abc" is specified by the pattern matching unit 604. The data deletion unit 607 deletes the portion matching the matching data "abc" in the data "abcF3" of the received user data signal according to the matching data "abc" of the specified SA. The remaining data after the deletion is "F3". The encryption unit 608 encrypts the remaining data "F3" of the received user data signal according to the key data of the specified SA. The SA identifier assignment unit 609 generates an encrypted packet which includes the remaining data "F3" and is assigned the SA identifier of the specified SA, and transmits the generated encrypted packet to the gateway 4 via the signal interface 601.

Furthermore, concurrently with the encrypting process in the process p114 by the pattern matching unit 604, the data deletion unit 607, the encryption unit 608, and the SA identifier assignment unit 609, the pattern generation unit 610 starts the dedicated tunnel generating process. The pattern generation unit 610 compares the user data signal newly stored in the packet buffer 605 by the pattern matching unit 604 with the sample packet already stored in the packet buffer 605. Then, the pattern generation unit 610 judges whether or not the ratio of the matching portions of the data patterns of the compared packets exceeds the specified threshold with which it is judged that the encrypted communication using the dedicated tunnel 7B in which the matching portion is defined as matching data is efficiently.

In the example illustrated in FIG. 14B, the data "abcF3" of the user data signal is compared with the data "abcD1" and the data "abcE2" of respective sample packets. For the matching portion "abc" of each piece of compared data, matching data has already been generated. Then, it is judged that the ratio is less than or equal to the specified threshold, and new matching data is not generated for the matching portion "abc".

The SA identifier retrieval unit 611 of the gateway 4 receives the encrypted packet which includes the remaining data "F3" and which is transmitted from the wireless base station device 3, via the signal interface 601 (process p115). The SA identifier retrieval unit 611 refers to the SA identifier of the received encrypted packet, and specifies the SA of the received encrypted packet.

In the example illustrated in FIG. 14A, the specified SA is a SA related to the dedicated tunnel 7B having "abc" as matching data. Then, the decryption unit 612 decrypts the received encrypted packet according to the key data of the specified SA. Furthermore, the data reconstruction unit 613 inserts the data pattern corresponding to the matching data "abc" into the remaining data decrypted by the decryption unit 612 according to the matching data of the specifies SA, thereby reconstructing the received encrypted packet to the packet including the data "abcF3". The packet terminal unit 603 transmits the reconstructed packet including the data "abcF3" to the core network 5 (process p117).

The packet terminal unit 603 of the wireless base station device 3 receives a user data signal from the wireless communication terminal device 2 (process p118). In the example illustrated in FIG. 14C, the user data signal received in the process p118 includes data "abcF4".

In the process p119, the pattern matching unit 604 stores the received user data signal in the packet buffer 605. In addition, the pattern matching unit 604 retrieves the SA associated with the SP of the received user data signal from the key information unit 606, and judges whether or not there is a SA including the matching data whose data pattern matches the data pattern of the data in the received user data signal.

In the example illustrated in FIG. 14C, there is the SA including the matching data "abc" in the key information unit 606. Then, the SA including the matching data "abc" is specified by the pattern matching unit 604. The data deletion unit 607 deletes the portion matching the matching data "abc" in the data "abcF4" of the received user data signal according to the matching data "abc" of the specified SA. The remaining data after the deletion is "F4". The encryption unit 608 encrypts the remaining data "F4" according to the key data of the specified SA. The SA identifier assignment unit 609 generates an encrypted packet which includes the remaining data "F4" and is assigned the SA identifier of the specified SA, and transmits the generated encrypted packet to the gateway 4 via the signal interface 601.

The SA identifier retrieval unit 611 of the gateway 4 receives the encrypted packet which includes the remaining data "F4" and which is transmitted from the wireless base station device 3, via the signal interface 601 (process p120). The SA identifier retrieval unit 611 refers to the SA identifier of the received encrypted packet, and specifies the SA of the received encrypted packet.

In the example illustrated in FIG. 14C, the specified SA is a SA related to the dedicated tunnel 7B having "abc" as matching data. The decryption unit 612 decrypts the received encrypted packet according to the key data of the specified SA. Furthermore, the data reconstruction unit 613 inserts the data pattern corresponding to the matching data "abc" into the remaining data decrypted by the decryption unit 612 according to the matching data of the specified SA, and reconstructs the received encrypted packet to a packet including the data "abcF4". The packet terminal unit 603 transmits the reconstructed packet including the data "abcF4" to the core network 5 (process P121).

Furthermore, concurrently with the encrypting process in the process p119 by the pattern matching unit 604, the data deletion unit 607, the encryption unit 608, and the SA identifier assignment unit 609, the pattern generation unit 610 of the wireless base station device 3 starts the dedicated tunnel generating process. The pattern generation unit 610 compares the user data signal newly stored in the packet buffer 605 by the pattern matching unit 604 with the sample packet already stored in the packet buffer 605. Then, the pattern generation unit 610 judges whether or not the ratio of the matching portions of the data patterns of the compared packets exceeds the specified threshold with which it is judged that the encrypted communication using the dedicated tunnel 7B in which the matching portion is defined as matching data is efficiently.

In the example illustrated in FIG. 14C, the data "abcF4" of the user data signal is compared with the data "abcD1", the data "abcE2", and the data "abcF3" of each sample packet. Since the data portions of "abcF" match each other, the ratio of the sample packets having the matching data portion of "abcF" to all sample packets is one third, and the data size is larger than the already existing matching data "abc", it is judged that the encrypted communication by using the SA having "abcF" as matching data is efficiently. Then, the pattern generation unit 610 instructs the key information exchange unit 602 to generate the SA having "abcF" as matching data.

Upon receipt of the instruction, the key information exchange unit 602 communicates a key information exchange packet with the key information exchange unit 602 of the gateway 4 (processes p122 and p123), and establishes the SA having "abcF" as matching data with the gateway 4.

The packet terminal unit 603 of the wireless base station device 3 receives a user data signal from the wireless communication terminal device 2 (process p124). In the example illustrated in FIG. 14C, the user data signal received in the process p124 includes data "abcF5".

In the process p125, the pattern matching unit 604 stores the received user data signal in the packet buffer 605. In addition, the pattern matching unit 604 retrieves the SA associated with the SP of the received user data signal from the key information unit 606, and judges whether or not there is a SA including the matching data whose data pattern matches the data pattern of the data in the received user data signal.

In the example illustrated in FIG. 14C, there are the SA including the matching data "abc" (matching pattern A) and the SA including the matching data "abcF" (matching pattern B) in the key information unit 606. When there are a plurality of SAs as described above, the pattern matching unit 604 selects the SA including the matching data which has the larger data size to perform an effective encrypted communication having lower traffic. In this example, the SA including the matching data "abcF" (matching pattern B) is selected.

The data deletion unit 607 deletes a portion matching the matching data "abcF" in the data "abcF5" in the received user data signal according to the matching data "abcF" of the selected SA. The remaining data after the deletion is "5". The encryption unit 608 encrypts the remaining data "5" according to the key data of the selected SA. The SA identifier assignment unit 609 generates an encrypted packet which includes the remaining data "5" and is assigned the SA identifier of the selected SA, and transmits the generated encrypted packet to the gateway 4 via the signal interface 601.

The SA identifier retrieval unit 611 of the gateway 4 receives the encrypted packet which is transmitted from the wireless base station device 3 and which includes the remaining data "5", via the signal interface 601 (process p126). The SA identifier retrieval unit 611 refers to the SA identifier of the received encrypted packet, and specifies the SA of the received encrypted packet.

In the example illustrated in FIG. 14C, the specified SA is a SA having "abcF" as matching data. Then, the decryption unit 612 decrypts the received encrypted packet according to the key data of the specified SA. Furthermore, the data reconstruction unit 613 inserts the data pattern corresponding to the matching data "abcF" into the remaining data decrypted by the decryption unit 612 according to the matching data of the specifies SA, thereby reconstructing the received encrypted packet to the packet including the data "abcF5". The packet terminal unit 603 transmits the reconstructed packet including the data "abcF5" to the core network 5 (process p128).

The encrypted communication processing of the first embodiment is performed on the user data signal transmitted from the wireless communication terminal device 2 according to the similar process sequence.

For example, in the process p129 illustrated in FIG. 14D, when the packet terminal unit 603 of the wireless base station device 3 receives the user data signal including data "abcG6" from the wireless communication terminal device 2, the encrypted communication processing is performed based on the matching pattern A (processes p130 through p133). The encrypted communication processing according to the matching pattern A may be similar to the processing as described above about the processes p114 through p117. Furthermore, since the matching data for the data "abc" already exists as the matching pattern A, the SA including new matching data is not generated in process p119.

In addition, in the process p134, when the packet terminal unit 603 of the wireless base station device 3 receives the user data signal including data "abhI" from the wireless communication terminal device 2, the encrypted communication processing based on the SA relating to the common tunnel 7A is performed (processes p135 through p137). The encrypted communication processing based on the SA relating to the common tunnel is similar to the processing as described above in the processes p108 through p110. Furthermore, since the data size of the data portion "ab" in the user data signal whose data pattern matches the data pattern of each sample packet is smaller than the data size of the existing matching data, an SA including new matching data is not generated in process p135.

Thus, the wireless base station device 3 including the encrypted communication device 6 according to the first embodiment may encrypt the remaining data excluding the matching data in the data of the packet targeted for transmission. Therefore, the load of the encrypting process of the wireless base station device 3 may be reduced. In addition, since the payload of the encrypted packet encrypted according to the SA including the matching data is configured by the remaining data in the packet targeted for transmission, the traffic in the communication system 1 may be reduced.

On addition the gateway 4 including the encrypted communication device 6 according to the first embodiment may reconstruct the received encrypted packet to the original data in the packet targeted for transmission based on the encrypted packet transmitted from the wireless base station device 3. Therefore, even when a part of the data in the packet targeted for transmission is not transmitted by using an encrypted packet, the encrypted communication of the packet targeted for transmission may be realized.

FIG. 1 is only an example of the communication system 1 including the encrypted communication device 6 according to the first embodiment. That is, in the example illustrated in FIG. 1, the encrypted communication device 6 according to the first embodiment is included in the wireless base station device 3 and the gateway 4, and an encrypted communication according to the first embodiment is performed between the wireless base station device 3 and the gateway 4.

However, the encrypted communication device 6 according to the first embodiment may be included in a plurality of wireless base station devices 3, and an encrypted communication according to the first embodiment may be performed among the plurality of wireless base station devices 3. Furthermore, the encrypted communication device 6 according to the first embodiment may be included in a plurality of gateways 4, and an encrypted communication according to the first embodiment may be performed among the plurality of gateways 4.

In addition, the encrypted communication device 6 according to the first embodiment may be included in the wireless communication terminal device 2, and may perform an encrypted communication according to the first embodiment with another device including the encrypted communication device 6 according to the first embodiment. When the encrypted communication device 6 is included in the wireless communication terminal device 2, a communication interface corresponding to the signal interface 601 may be added between the DSP 204 and the GbE L2SW 207. The key information exchange unit 602, the packet terminal unit 603, the pattern matching unit 604, the data deletion unit 607, the SA identifier assignment unit 609, the pattern generation unit 610, and the data reconstruction unit 613 correspond to the CPU 201. The packet buffer 605 and the key information unit 606 correspond to the memory 202. The encryption unit 608 and the decryption unit 612 correspond to the security device 203.

Furthermore, the device which exists in the core network 5 such as an S-GW, an MME, a P-GW, etc. may include the encrypted communication device 6 according to the first embodiment. Furthermore, a server device connected to an external network such as the Internet etc. via the core network 5 may include the encrypted communication device 6 according to the first embodiment.

The communication system described above may also acquire an effect similar to that of the example illustrated in FIG. 1.

Second Embodiment

As the example illustrated in FIG. 10, in the encrypted communication processing according to the first embodiment, the dedicated tunnel generating process is performed concurrently with the encrypting process. However, the dedicated tunnel generating process may be performed concurrently with the decrypting process instead of the encrypting process.

Figure 15:
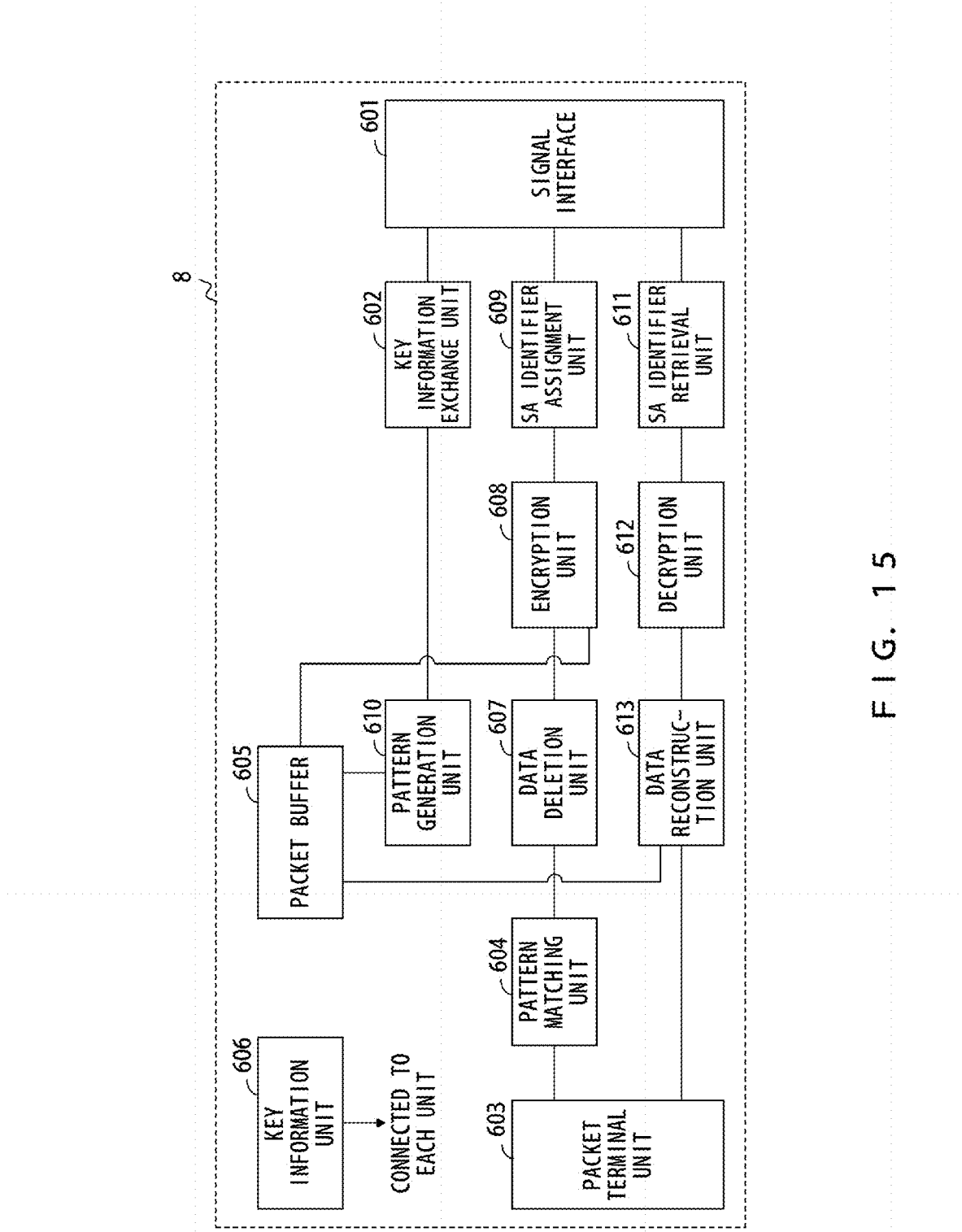
FIG. 15 illustrates an exemplary functional configuration of an encrypted communication device according to the second embodiment of the present invention.

FIG. 15 illustrates an exemplary functional configuration of an encrypted communication device according to the second embodiment of the present invention. In an encrypted communication device 8 according to the second embodiment illustrated in FIG. 15, the same component as the encrypted communication device 6 illustrated in FIG. 5 is assigned the same reference numeral. The encrypted communication device 8 is similar to the encrypted communication device 6 according to the first embodiment as illustrated in FIG. 5 except the point that the configuration is made to perform the encrypted communication processing described below.

Figure 16:
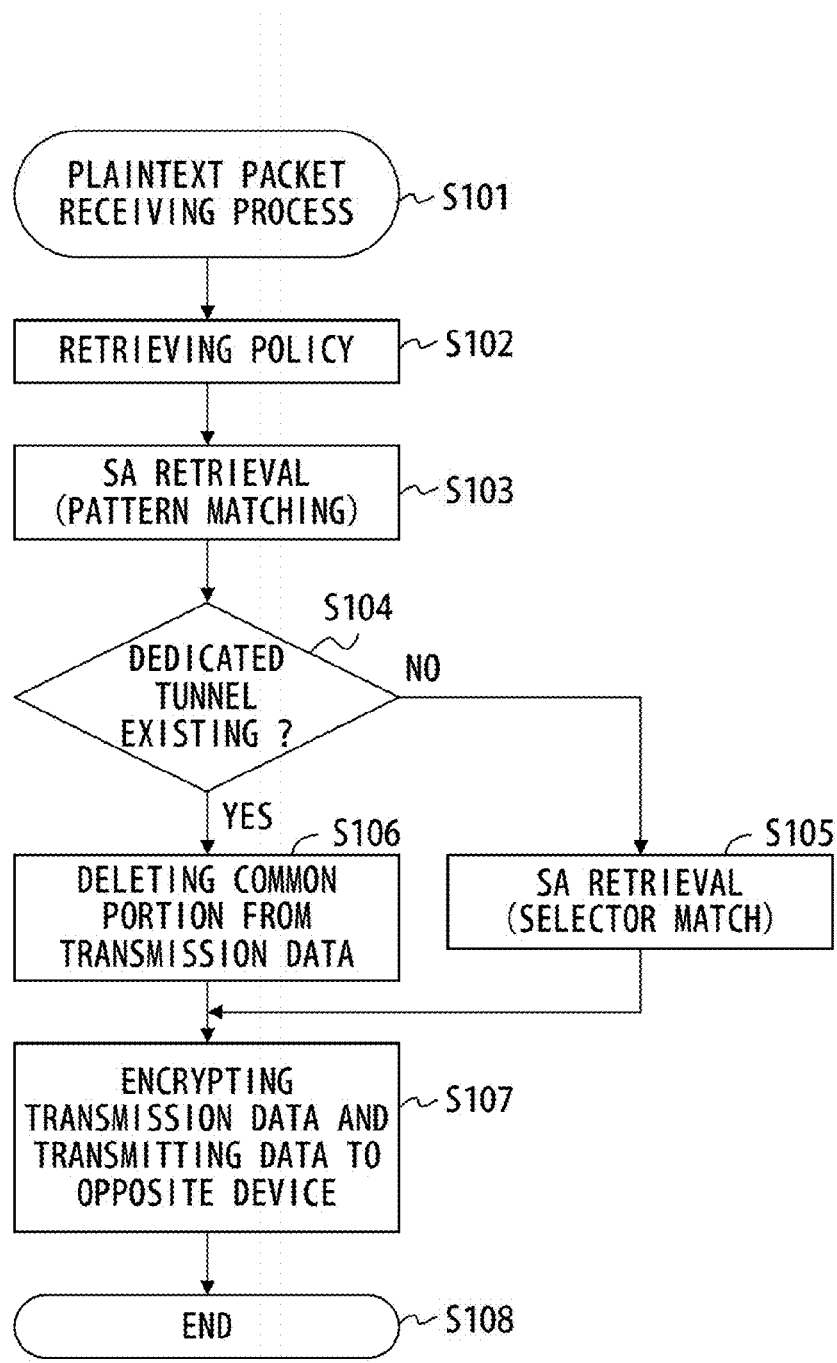
FIG. 16 illustrates an exemplary flowchart of an encrypting process according to the second embodiment of the present invention.

FIG. 16 illustrates an exemplary flowchart of an encrypting process according to the second embodiment of the present invention. As illustrated in FIG. 10, in the encrypted communication processing according to the first embodiment, the dedicated tunnel generating process is performed in step S109 concurrently with the encrypting process in steps S103 through S108. On the other hand, as illustrated in FIG. 16, in the encrypted communication processing according to the second embodiment, the dedicated tunnel generating process is not performed concurrently with the encrypting process. Except that the encrypting process is not performed concurrently with the dedicated tunnel generating process, the encrypting process according to the second embodiment may be similar to the encrypting process according to the first embodiment.

Figure 17:
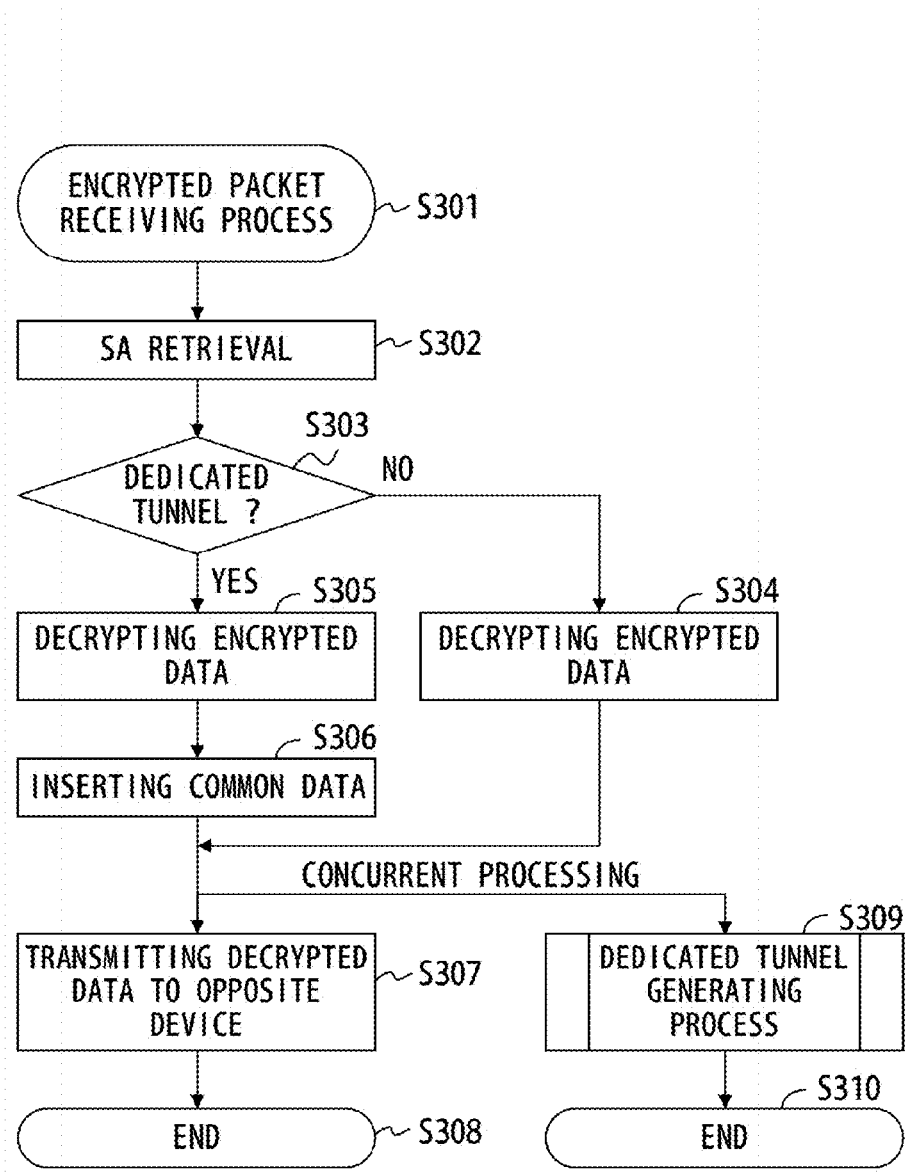
FIG. 17 illustrates an exemplary flowchart of a decrypting process according to the second embodiment of the present invention.

FIG. 17 illustrates an exemplary flowchart of a decrypting process according to the second embodiment of the present invention. As illustrated in FIG. 13, in the encrypted communication processing according to the first embodiment, the dedicated tunnel generating process is not performed concurrently with the decrypting process. On the other hand, as illustrated in FIG. 17, in the encrypted communication processing according to the second embodiment, the dedicated tunnel generating process is performed concurrently with the process (step S307) of transmitting a decrypted packet to the destination device (step S309). In the encrypted communication processing according to the second embodiment, the dedicated tunnel generating process is performed concurrently with the decrypting process, thereby suppressing the delay of the decrypting process as compared with the case in which the dedicated tunnel generating process is solely performed.

The dedicated tunnel generating process performed in step S309 in FIG. 17 may be similar to the dedicated tunnel generating process according to the first embodiment including an example as illustrated in FIG. 11 excluding the following process.

In the example of the dedicated tunnel generating process illustrated in FIG. 11, the process of storing a packet targeted for processing in step S202 is performed by the decryption unit 612 or the data reconstruction unit 613 instead of the pattern matching unit 604. That is, when the encrypted packet transmitted from the opposite encrypted communication device 8 has been transmitted through the common tunnel 7A, the packet decrypted by the decryption unit 612 is stored in the packet buffer 605 as a packet targeted for processing. When the encrypted packet transmitted from the encrypted communication device 8 has been transmitted through the dedicated tunnel 7B, the packet reconstructed by the data reconstruction unit 613 is stored in the packet buffer 605 as a packet targeted for processing.

In step S205, instead of the SA retrieval process by the pattern generation unit 610, the pattern generation unit 610 may acquire a retrieved result of SA by the SA identifier retrieval unit 611 in step S302.

The encrypted communication device, the communication system, and the encrypted communication method according to the second embodiment may have effects similar to those of the first embodiment. In addition, according to the encrypted communication device, the communication system, and the encrypted communication method according to the second embodiment, the process load and power consumption of the encrypted communication device on the transmission side may be suppressed.

Third Embodiment

As the example illustrated in FIG. 10, in the encrypted communication processing according to the first embodiment, the dedicated tunnel generating process is performed concurrently with the encrypting process. As the example illustrated in FIG. 17, in the encrypted communication processing according to the second embodiment, the dedicated tunnel generating process is performed concurrently with the decrypting process. However, the dedicated tunnel generating process may be configured to be performed concurrently with the encrypting process and the decrypting process.

FIG. 18 illustrates an exemplary functional configuration of an encrypted communication device according to the third embodiment of the present invention. In the encrypted communication device 9 according to the third embodiment illustrated in FIG. 18, the same component as the encrypted communication device 6 illustrated in FIG. 5 and the encrypted communication device 8 illustrated in FIG. 15 is assigned the same reference numeral. The encrypted communication device 9 according to the third embodiment may perform the encrypted communication processing according to the first and second embodiments described above.

The encrypted communication device, the communication system, and the encrypted communication method according to the third embodiment may have effects similar to those of the first and second embodiments.

Furthermore, in the communication system in which at least one of the devices on the transmission and the devices on reception sides includes the encrypted communication device 9, it may configured to be determined which encrypted communication device 6, 8, or 9 in the encrypted communication devices 6, 8, or 9 on the transmission side and on the reception side is to perform the dedicated tunnel generating process using a key information exchange packet among the encrypted communication devices at a time when the SA regarding to the common tunnel is established.

With the configuration above, for example, when the device on the transmission side includes the encrypted communication device 9 according to the third embodiment and the device on the reception side includes the encrypted communication device 6 according to the first embodiment, it may be determined that the device on the transmission side performs the dedicated tunnel generating process between the device on the transmission side and the device on the reception side. Therefore, with the configuration above, the compatibility with the opposite encrypted communication device may be secured.

In addition, with the configuration, the duplication of the dedicated tunnel generating process such as generating the same matching data in the encrypted communication device on the transmission side and the encrypted communication device on the reception side may be avoided.

Fourth Embodiment

The encrypted communication processing performed by the encrypted communication devices 6, 8, and 9 according to the first through third embodiments may be realized also by the program used to direct a computer to execute the encrypted communication processing according to the first through third embodiments, that is, the encrypted communication program according to the fourth embodiment.

The encrypted communication program according to the fourth embodiment is recorded on the recording medium such as a magnetic disk, an optical disk, a magneto optical disk, and semiconductor memory such as flash memory etc. The encrypted communication program recorded on the recording medium is read by, for example, the recording medium read-write devices 209, 310, and 407, respectively, and stored in the memory 202 through 402, respectively. The encrypted communication program recorded on the recording medium is taken to the devices 2 through 4 via the antenna 206 and 306 and the communication interfaces 309 and 406, respectively and stored in the memory 202 through 402, respectively. The CPUs 201 through 401 may perform the encrypted communication processing according to the encrypted communication program stored in the memory 202 through 402, respectively.

According to the encrypted communication program according to the fourth embodiment, the effects similar to those obtained by the encrypted communication method, the encrypted communication device, and the communication system may be obtained.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encrypted communication device comprising:
a storage; and
a processor that performs a process including:
judging whether matching data is included in data in a packet targeted for processing, the matching data being a data portion whose data pattern matches between the data in the packet targeted for processing and data in a sample packet;
transmitting to an opposite device a key information exchange packet including the matching data and key data when it is judged that the matching data is included, and receiving from the opposite device a key information exchange packet including a security association identifier of a security association, thereby establishing the security association with the opposite device; and
storing, as security association information, in the storage the matching data, the key data, and the security association identifier of the established security association, each of which corresponds with each other, wherein
the security association information stored in the storage is classified by a data size of the matching data included in the security association information, an address of the packet targeted for processing, and a port number.

2. The encrypted communication device according to claim 1, wherein
the process further includes:
retrieving from the storage the matching data whose data pattern matches the data pattern of at least a part of data in a packet targeted for transmission to the opposite device;
deleting from the packet targeted for transmission a data portion indicated by the retrieved matching data;
encrypting remaining data in the packet targeted for transmission from which the data portion indicated by the retrieved matching data is deleted; and
acquiring from the storage the security association identifier which corresponds to the retrieved matching data, generating an encrypted packet by assigning the acquired security association identifier to the encrypted remaining data, and transmitting the encrypted packet to the opposite device.

3. The encrypted communication device according to claim 2, wherein
when a plurality of the matching data is retrieved from the storage in the retrieving the matching data, the matching data having a largest data size in the plurality of the matching data is selected as the retrieving result.

4. The encrypted communication device according to claim 2, wherein
the process further includes:
receiving an encrypted packet transmitted from the opposite device, retrieving a security association identifier from the received encrypted packet, and specifying the security association with the opposite device;
decrypting data in the received encrypted packet according to the specified security association; and
acquiring matching data which corresponds to the retrieved security association identifier from the storage, and inserting a data portion indicated by the acquired matching data into the decrypted data.

5. The encrypted communication device according to claim 4, wherein
the process further includes generating a dedicated tunnel, through which the encrypted packet is transmitted, concurrently with the encrypting the remaining data.

6. The encrypted communication device according to claim 4, wherein
the process further includes generating a dedicated tunnel, through which the encrypted packet is transmitted, concurrently with the decrypting the data in the received encrypted packet.

7. The encrypted communication device according to claim 4, wherein
the process further includes generating a dedicated tunnel, through which the encrypted packet is transmitted, concurrently with the encrypting the remaining data and the decrypting the data in the received encrypted packet.

8. The encrypted communication device according to claim 1, wherein
in the establishing the security association during a rekey process, the matching data is copied and the copied matching data is used for establishing a new security association.

9. The encrypted communication device according to claim 1, wherein
the security association information stored in the storage is associated with a security policy for the packet targeted for processing.

10. The encrypted communication device according to claim 1, wherein
the process further includes determining with the opposite device as to which device is to be used, the encrypted communication device and the opposite device, to perform generating a dedicated tunnel, through which the encrypted packet is transmitted, using a key information exchange packet for establishment of a security association which does not include the matching data for the packet targeted for processing.

11. The encrypted communication device according to claim 1, wherein
a packet including control data which is communicated with the opposite device is used for the judging whether the matching data is included in the data in the packet targeted for processing, the control data including the same data pattern which the data included in the packet targeted for processing includes.

12. The encrypted communication device according to claim 1, wherein
the security association is established when a data size of the data portion is larger than a data size of the matching data which is previously stored in the storage and which is associated with a same security policy as the packet targeted for processing.

13. The encrypted communication device according to claim 1, wherein
the security association is established using the matching data having the largest data size in a plurality of the matching data, each of the plurality of the matching data being a data portion whose data pattern matches between the data in the packet targeted for processing and data in each of a plurality of sample packets.

14. An encrypted communication method performed by a first encrypted communication device and a second encrypted communication device, the encrypted communication method comprising:
judging, by the first encrypted communication device, whether matching data is included in data in a packet targeted for processing, the matching data being a data portion whose data pattern matches between the data in the packet targeted for processing and data in a sample packet;
transmitting, by the first encrypted communication device, to the second encrypted communication device a key information exchange packet including the matching data and key data when it is judged that matching data is included;
receiving, by the second encrypted communication device, the key information exchange packet transmitted from the first encrypted communication device;
generating, by the second encrypted communication device, a security association identifier of a security association;
transmitting, by the second encrypted communication device, to the first encrypted communication device the key information exchange packet including the generated security association identifier;
receiving, by the first encrypted communication device, the key information exchange packet transmitted from the second encrypted communication device, thereby establishing the security association with the second encrypted communication device; and
storing, by the first encrypted communication device, in a storage included in the first encrypted communication device, as security association information, the matching data, the key data, and the security association identifier of the established security association, each of which corresponds with each other, wherein
the security association information stored in the storage is classified by a data size of the matching data included in the security association information, an address of the packet targeted for processing, and a port number.

15. A non-transitory computer-readable recording medium stored therein an encrypted communication program for causing a computer to perform an encrypted communication process, the encrypted communication process comprising:
judging whether matching data is included in data in a packet targeted for processing, the matching data being a data portion whose data pattern matches between the data in the packet targeted for processing and data in a sample packet;
transmitting to an opposite device a key information exchange packet including the matching data and key data when it is judged that the matching data is included, and receiving from the opposite device a key information exchange packet including a security association identifier of a security association, thereby establishing the security association with the opposite device; and
storing, as security association information, in a storage the matching data, the key data, and the security association identifier of the established security association, each of which corresponds with each other, wherein
the security association information stored in the storage is classified by a data size of the matching data included in the security association information, an address of the packet targeted for processing, and a port number.

* * * * *